(12) United States Patent
Frouin et al.

(10) Patent No.: US 7,099,322 B1
(45) Date of Patent: Aug. 29, 2006

(54) METHOD AND DEVICE FOR ASSIGNING AT LEAST ONE ROUTING IDENTIFIER TO AT LEAST ONE BRIDGE IN A NETWORK

(75) Inventors: Laurent Frouin, Rennes (FR); Jean-Paul Accarie, Vern sur Seiche (FR); Yacine Smail El Kolli, Rennes (FR); Falk Tannhauser, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/535,546

(22) Filed: Mar. 27, 2000

(30) Foreign Application Priority Data

| Mar. 25, 1999 | (FR) | 99 03754 |
| Mar. 25, 1999 | (FR) | 99 03755 |
| Mar. 25, 1999 | (FR) | 99 03756 |
| Mar. 25, 1999 | (FR) | 99 03757 |
| Jun. 9, 1999 | (FR) | 99 07293 |

(51) Int. Cl.
*H04L 12/28* (2006.01)
(52) U.S. Cl. .................... 370/390; 370/351
(58) Field of Classification Search ............ 370/389, 370/401, 402, 403, 407, 408, 409, 410, 422, 370/423, 425
See application file for complete search history.

(56) References Cited

U.S. PATENT DOCUMENTS

| 5,506,838 | A | 4/1996 | Flanagan ............... 370/54 |
| 5,570,084 | A | 10/1996 | Ritter et al. ............ 340/825.05 |
| 5,724,517 | A | 3/1998 | Cook et al. ............ 395/200.57 |
| 5,909,594 | A * | 6/1999 | Ross et al. ............ 710/20 |
| 6,084,892 | A * | 7/2000 | Benash et al. ............ 370/401 |
| 6,426,943 | B1 * | 7/2002 | Spinney et al. ............ 370/235 |
| 6,512,767 | B1 * | 1/2003 | Takeda et al. ............ 370/389 |
| 6,631,134 | B1 * | 10/2003 | Zadikian et al. ....... 370/395.21 |
| 6,678,781 | B1 * | 1/2004 | Domon ............... 710/312 |

FOREIGN PATENT DOCUMENTS

| DE | 4023767 A1 | 3/1991 |
| EP | 0518 595 A2 | 12/1992 |
| EP | 0518595 A3 | 12/1992 |
| WO | WO 99/00938 | 1/1999 |

OTHER PUBLICATIONS

Lai, W.S., "Packet Forwarding", IEEE Communications Magazine, US, IEEE Service Center, vol. 26, No. 7, Jul. 1988, pp. 8-17.

(Continued)

*Primary Examiner*—Doris H. To
*Assistant Examiner*—Thien D. Tran
(74) *Attorney, Agent, or Firm*—Fitzpatrick, Cella, Harper & Scinto

(57) ABSTRACT

The invention relates to a method for allocating at least one identifier known as routing identifier to at least one bridge of a network, the bridge comprising at least two interconnection equipment a first of which is connected to at least one first part of the said network, characterized in that each one of the interconnection equipment of the said bridge being in a "state" determined by reference to the allocation of an identifier to this interconnection equipment, the method includes the steps of determination of at least one "state" which corresponds to the "state" of the at least one second interconnection equipment of the bridge, and deciding as to the allocation of an identifier to the at least one first interconnection equipment of the bridge as a function of the at least one determined "state".

7 Claims, 22 Drawing Sheets

OTHER PUBLICATIONS

Paskins, A., "The IEEE 1394 Bus", IEE Half-Day Colloquium on New High Capacity Digital Media and Their Applications, May 12, 1997.

Pitt, D.A., "Table-Free Bridging", IEEE Journal on Selected Areas in Communications, US., IEEE, vol. SAC-5, No. 9, Dec. 1, 1987, pp. 1454-1464.

Anderson, D., "FireWire System Architecture", Addison-Wesley, USA, Dec. 1998, pp. 14-16 and 390-402.

Paskins, A., "The IEEE 1394 Bus", IEE Half-Day Colloquium On New High Capacity Digital Media and Their Applications, May 12, 1997.

Boucachard, P, et al., "Simple Routing Method Application For P1394.1", IEEE P1394.1 Documents, 'Online!, Mar. 25, 1999.

Anderson, D., "PHY Registers", FireWire System Architecture, Addison Wesley, USA, pp. 393-405 (date unknown).

* cited by examiner

METHOD AND DEVICE FOR ASSIGNING AT LEAST ONE ROUTING IDENTIFIER TO AT LEAST ONE BRIDGE IN A NETWORK

BACKGROUND OF THE INVENTION

Field of the Invention

According to a first aspect of the invention, the present invention relates to a method and a device for allocating at least one identifier, known as routing identifier, to at least one bridge in a network, the said bridge comprising at least two interconnection equipment, a first of which is connected to at least one first part of the said network and at least a second of which is connected to at least one second part of the said network.

Communication networks are known which are formed from several serial communication buses in accordance with the IEEE standard 1394.

These buses are organised into a network, that is to say that they are linked together by items of apparatus which are called "bridges".

A bridge makes it possible to transfer data packets from a first part of the network or first sub-network to a second part of the network or second sub-network via a wire, optical or radio link or by any other type of link.

Part of a network may equally be termed a sub-network.

The bridges linking serial communications buses together are more particularly the subject of the standard P 1394.1 which is under discussion.

In the context of this standard, a bridge more particularly includes at least two portions called "portals" and making it possible to link together at least two 1394 serial communications buses. An interconnection equipment or "portal" is a set of ports in accordance with the 1394 standard and connected to a 1394 serial communications bus.

Each serial communications bus of such a network links together various peripherals such as printers, computers, servers, scanners, video recorders, set-top boxes, television sets, digital cameras, camcorders, digital photographic apparatus, etc.

These peripherals are generally called nodes.

Each apparatus or peripheral situated on a bus of the network may wish to communicate with another apparatus of the network situated on another bus of the network, the two buses on which these apparatus are situated being separated by one or more bridges.

This information is, for example, contained in a data packet circulating on the different buses in the network which the data packet travels.

To reach the destination apparatus, the data packet must know the path it is to follow.

This path is contained in the data packet in the form of information known as identification information capable of being placed, for example, in the header of the said packet.

The identification information, as its name indicates, identifies the bridges met by the packet on its path and, more exactly, the interconnection equipment themselves, as well as the destination apparatus.

In order that the path may be established, it is therefore necessary to provide a determination phase for the identifiers known as "routing" (also called identifiers or routing labels) at least to certain bridges in the network in order to identify the particular bridge or bridges under consideration.

The phase of allocating the routing labels relies on a mechanism which registers the various apparatus present on a bus.

This enumeration mechanism is activated every time an apparatus is added to or removed from a bus and includes several stages.

During a first phase, an identifier known as the physical identifier is determined in a fashion unique to each apparatus on a given bus.

In this way, each bridge has two physical indicators allocated to it, by each of the two buses to which it is connected, each identifier being associated with an interconnection equipment on the said bridge or "portal".

During this first phase, the interconnection equipment of a particular bus all identify themselves to the others.

In this way, any interconnection equipment on a bus recognises the physical indicator associated with each one of the other interconnection equipment on the same bus.

Following the switching on of several apparatus on the same bus, a second phase gives rise to a phase of allocating an indicator known as the "virtual indicator" for all apparatus, as a function of the position of the interconnection equipment having the largest physical identifier.

In this way, this interconnection equipment is referred to as "alpha-portal" and carries a virtual identifier equal to 0.

Therefore, at the level of each interconnection equipment on the bus, a table of identity correspondence is obtained between the physical identifier and the virtual identifier of each apparatus connected to the bus.

The subsequent phases of the registration mechanism give rise to a comparison between the old and the new topology of the bus in accordance with common procedures, which allows each interconnection equipment on the bus to update in an identical manner an identifier correspondence table which it then holds, in order to keep constant the value of the virtual identifier associated with each apparatus connected to the bus.

In this way, viewed from outside the bus, the values of the virtual identifiers remain unchanged, regardless of any modification to the topology of the bus under consideration.

The allocation of an identifier or routing label to each apparatus, as a function of the value of the virtual identifier, is known from the French patent application No. 9903755 which was unpublished at the date of filing of the present application.

In this way, for example, in ascending order of the values for the virtual identifier, an unique identifier or routing label, starting with 0 up to the last available value, can be allocated to all the interconnection equipment. This last value is defined by the number of bits allocated for the coding of each identifier or routing label, and therefore the number of routing labels for a given bus is limited.

By way of example, a coding using 3 bits for each routing label allows a routing label to be allocated to $2^3-1$ apparatus on a bus.

Therefore, when the last available routing label value has been allocated, certain interconnection equipment on the bus may not have received an identifier or routing label and the corresponding bridge will not be able to transfer packets between the two buses which it connects. This bridge is then considered as disabled.

It follows that there is a risk that the performance of the network will be affected.

SUMMARY OF INVENTION

According to a first aspect, the present invention aims to remedy this problem, proposing as it does a method for allocating at least one identifier known as routing identifier to at least one bridge in a network, the said bridge comprising at least two interconnection equipment, a first of which is connected to at least one first part of the said network and at least a second of which is connected to at least one second part of the said network, characterised in that each one of the interconnection equipment of the said bridge being in a "state" determined by reference to the allocation of an identifier to this interconnection equipment, the said method comprises the following steps:

determination of at least one "state" which corresponds to the "state" of the said at least one second interconnection equipment of the said bridge, decision as to the allocation of an identifier to the said at least one first interconnection equipment of the said bridge as a function of the said at least one determined "state".

In this way, the fact of determining the "state" of this second interconnection equipment allows the usefulness of allocating an identifier to the first interconnection equipment to be ascertained.

Because, in the case where the "state" of this second interconnection equipment shows that no identifier has been assigned to it, then it will not be possible for any data packet to be transferred via the bridge, having regard to state, and it is therefore preferable not to allocate an identifier to the first interconnection equipment.

On the contrary, the available identifier will be used more efficiently if it is allocated to a first interconnection equipment of another bridge, of which the second interconnection equipment with which it forms the bridge is either in a "state" where an identifier has been allocated to it, or in a "state" where the said equipment is waiting for an identifier to be assigned.

The performance of at least one part of the network may be improved as a consequence.

According to one characteristic which can be combined with any one of the previous characteristics, the method includes a step for determining the "state" of the said at least one first interconnection equipment of the said bridge and the decision step takes into account the "state" of the said at least two interconnection equipment.

The "state" of a first interconnection equipment does not depend only on the configuration of the first part of the network to which it is connected, but also on the configuration of the adjacent second part of the network which is connected to the second interconnection equipment. In this way, the determination of the "state" of an interconnection equipment takes into account a greater portion of the network and thus the performance of at least one part of the network may be improved.

According to another characteristic which can be combined with any one of the previous characteristics, the method includes a step of sending a command sent to at least certain other bridges in the first part of the network, informing them that the identifier previously allocated to the said at least one first interconnection equipment of the bridge is henceforth no longer allocated to this interconnection equipment.

The sending of this command allows other interconnection equipment of the first part of the network to which they are connected, for example, on the same bus, to be informed that a routing label is once more available and this potentially authorises the reactivation of a previously disabled bridge, to which this identifier will then be allocated.

In addition, this command allows a group of interconnection equipment on this first part of the network to be notified of the allocation of a routing label, thus allowing the coherence of the identifier correspondence table to be maintained.

This allows the activation of a bridge other than that transmitting the command and, as a consequence, the improvement of the performance of at least one part of the network.

According to yet another characteristic which can be combined with any one of the previous characteristics, the method includes a step of sending a command to at least certain other bridges in the first part of the network and informing them that an identifier has been allocated to the said at least one first interconnection equipment of the bridge.

The sending of this command allows other interconnection equipment on the first part of the network to which they are connected, for example, on the same bus, to be notified that a routing label has just been allocated and thus allowing the reactivation of a bridge.

In addition, this command allows a group of interconnection equipment on this first part of the network to be notified of the allocation of a routing label, thus allowing the coherence of the identifier correspondence table to be maintained.

This allows activation of the bridge which sends the command and, as a consequence, improvement in performance of at least one part of the network.

According to yet another characteristic which can be combined with any one of the previous characteristics, the step of sending a command to at least certain other bridges in the first part of the network, informing them that the identifier previously assigned to the said at least one first interconnection equipment is henceforth no longer allocated to this interconnection equipment, precedes the step of sending a command to at least certain other bridges in the first part of the network and informing them that an identifier has been allocated to at least one first interconnection equipment of the bridge.

It should be noted that the step of releasing a routing label precedes that of allocating a routing label.

The "state" of an interconnection equipment corresponds to one of the following cases: an identifier has not been allocated to the said interconnection equipment, an identifier has been allocated to the said interconnection equipment or the said interconnection equipment is awaiting the allocation of an identifier.

According to one characteristic which can be combined with any one of the previous characteristics, the "state" of the said at least one second interconnection equipment of the said bridge corresponds to the case where an identifier has not been allocated to the said interconnection equipment.

According to one characteristic which can be combined with any one of the previous characteristics, the said at least one second interconnection equipment of the said bridge passes from the "state" where the said at least one second interconnection equipment is awaiting allocation to the "state" where an identifier is not allocated to this interconnection equipment.

According to one characteristic which can be combined with any one of the previous characteristics, the "state" of the said at least one second interconnection equipment of the said bridge corresponds to the case where an identifier has been allocated to the said interconnection equipment.

According to one characteristic which can be combined with any one of the previous characteristics, the said at least one first interconnection equipment of the said bridge is in a "state" where an identifier has been allocated to this interconnection equipment.

According to another characteristic which can be combined with any one of the previous characteristics, the said at least one first interconnection equipment of the said bridge passes from the "state" where the said interconnection equipment is waiting for allocation to the "state" where an identifier is not allocated to this interconnection equipment.

The advantage associated with the manipulation of the different states rests in the fact that it makes it possible to identify interconnection equipment or "portals" able to send an identifier-releasing command (passage from the "active" state to the "standby" state) as well as interconnection equipment or "portals" able to send a reservation command (passage from the "standby" state to the "active" state).

According to one characteristic which can be combined with any one of the previous characteristics, when the said at least one second interconnection equipment or "portal" is in a "state" where an identifier is not allocated to it, then the method comprises a step of sending a command to at least certain other bridges in the first part of the network informing them that the identifier allocated previously to the said at least one first interconnection equipment of the bridge is in future no longer allocated to this interconnection equipment.

According to one characteristic which can be combined with any one of the previous characteristics, when the said at least one second interconnection equipment or "portal" passes from the "state" where it is awaiting allocation of an identifier to the "state" where an identifier is not allocated to it, then the method comprises a step during which a command is transmitted to at least certain other bridges in the first part of the network and informing them that the identifier previously allocated to the said at least one first interconnection equipment of the bridge is in future no longer allocated to this interconnection equipment.

According to one characteristic which can be combined with any one of the previous characteristics, when the said at least one first interconnection equipment or "portal" of the said bridge passes from the "state" where it is awaiting allocation to the "state" where an identifier is not allocated to it, then the method comprises a step of sending a command to at least certain other bridges in the first part of the network and informing them that an identifier has been allocated to the said at least one first interconnection equipment of the bridge.

According to one particular characteristic which can be combined with any one of the previous characteristics, the method comprises a step during which the commands sent over the first and second parts of the network respectively are desynchronised.

This makes it possible to avoid a blocking situation, when the "state" of each interconnection equipment or "portal" of the said bridge is altered at the same moment.

Hence, for example, the method comprises a step of altering the sending speed of a command by the first interconnection equipment of the bridge with reference to the said at least one second interconnection equipment of the said bridge.

According to one characteristic which can be combined with any one of the previous characteristics, the method includes a step during which the commands sent respectively between the various interconnection equipment connected to the first part of the network are desynchronised.

This characteristic likewise allows a blocking situation to be avoided, when the "state" of each interconnection equipment connected to the same first part of the network, for example a communication bus, is modified at the same moment.

According to one characteristic which can be combined with any one of the previous characteristics, the desynchronisation is adapted as a function of the value of an identifier (the virtual identifier) for each interconnection equipment.

For example, the first part of the network comprises a communication bus to which are connected the bridge connecting the first and second parts of the network as well as other bridges.

For example, the communication bus is a serial communication bus which is, more particularly, of a type conforming to the IEEE 1394 standard.

Advantageously, when the first part of the network comprises a communication bus and when a release and/or a reservation command for a routing label is sent to at least certain other bridges connected to this bus, then the sending of the command concerns only the bus and, as a consequence, does not disturb the remainder of the network.

Correspondingly, the invention envisages a device for allocating at least one identifier known as routing identifier to at least one bridge in a network, the said bridge comprising at least two interconnection equipment, a first of which is connected to at least one first part of the said network and at least a second of which is connected to at least one second part of the said network, characterised in that each one of the interconnection equipment of the said bridge being in a "state" determined by reference to the allocation of an identifier to this interconnection equipment, the said device comprises:

means for the determination of at least one "state" which corresponds to the "state" of the said at least one second interconnection equipment of the said bridge, means for deciding as to the allocation of an identifier to the said at least one first interconnection equipment of the said bridge as a function of the said at least one determined "state".

The invention also envisages interconnection equipment connected to at least one first part of a network, interconnecting the latter with at least one second part of the said network, characterized in that the said interconnection equipment comprises a device such as that described above.

According to one characteristic, each one of the said at least two parts of the said network comprises at least one communication bus to which is connected one of the said at least two interconnection equipment.

The invention further envisages a bridge interconnecting at least two parts of a communication network, characterised in that the said bridge comprises at least two interconnection equipment connected respectively to each of the said communication network and which each conform with the foregoing provisions.

The invention envisages an apparatus for data processing, characterised in that it includes an interconnection equipment conforming with the brief description which has already been given.

According to the second aspect, the present invention envisages overcoming at least one of the above-mentioned drawbacks by proposing a method for data packet transfer across a bridge linking at least two parts of a communications network together, the said data packet including at least one information field for identifying the path of this packet across the said network, the said method including the following steps:

reading of the said at least one identification information field, and transfer of the said data packet across the said bridge, characterised in that the said method includes the following steps:

determination so as to discover whether the position of the data packet in the network corresponds to that of one of the two bridges called end bridges, situated at the two ends of the path of the said data packet, modification of the said identification information field to match the fact that the data packet is in one of these two positions.

Correspondingly, the present invention envisages a device for data packet transfer across a bridge linking at least two parts of a communications network together, the said data packet including at least one information field for identifying the path of this packet across the said network, the said device including:

means for reading the said at least one identification information field, and means for transfer of the said data packet across the said bridge, characterised in that the said device includes:

means for determination so as to discover whether the position of the data packet in the network corresponds to that of one of the two bridges called end bridges, situated at the two ends of the path of the said data packet, means for applying a modification of the said identification information field to match the fact that the data packet is in one of these two positions.

According to a third aspect of the present invention which can be combined with the first aspect and/or the second aspect, the present invention thus proposes a method of determining a path of a data packet in a communications network including at least two communications buses linked together by at least two bridges, one of them being a source bridge connected to a first bus, the at least one other bridge being connected to a second bus, characterised in that it includes the following steps:

reception, within the said at least one other bridge, of a data packet called broadcast data packet, sent out by the source bridge and including at least one field of a first type identifying at least one peripheral for which the said packet is intended, and at least one field of a second type including information representative of a path travelled by the said packet from the said source bridge to the said at least one other bridge, comparison of the said at least one field of first type with respect to at least one predetermined value known as end-of-transfer value, so as to determine whether the packet received is intended for one of the peripherals linked to the second bus.

Advantageously, the invention proposes sending, from the source bridge, a broadcast packet which, in step with its transfer across various bridges of the network, derives the path travelled by the said packet up to the last bridge crossed.

When the packet is received within the bridge in question, the said packet already encloses within itself the information representing the path travelled and the invention provides for a test to be carried out on the field of the first type so as to determine whether the packet has reached the destination bridge and thus whether this packet therefore holds the information on the path travelled between the source bridge and the destination bridge.

It will be noted that the problem solved by the invention set out above can be regarded as a sub-problem of a problem consisting, more precisely, in knowing the path making it possible to get from the source bridge to the destination bridge.

To this end, the information representing the path travelled up to the destination bridge will, for example, be able to be used in order to send back to the source bridge a response packet which will thus contain the information necessary for sending data from the source bridge to the destination bridge.

Thus, it appears that when determining in a bridge whether the packet is intended for a peripheral connected to the bus to which said bridge is also connected this amounts to determine whether the packet is in one of the two positions corresponding to that of one of the two bridges called end bridges, situated at the two ends of the path of said packet, as set forth in accordance with the first aspect of the invention.

The invention also envisages a method of receiving a data packet transmitted in a communications network including at least two communications buses linked together by at least one bridge, characterised in that it includes a step of receiving, within the said bridge called source bridge, originating from a first bus, a packet called response packet sent out by a bridge called destination bridge, in response to a packet called broadcast packet sent out by the said source bridge and including a field of information called identification information including information representing a path travelled by the said broadcast packet up to the said destination bridge, the said response packet including information representing the path which it has travelled from the destination bridge to the source bridge.

Correspondingly, the invention envisages a device for determining a path of a data packet in a communications network including at least two communications buses linked together by at least two bridges, one of them being a source bridge connected to a first bus, the at least one other bridge being connected to a second bus, characterised in that it includes:

means, within the said at least one other bridge, for receiving a data packet called broadcast data packet, sent out by the source bridge and including at least one field of a first type identifying at least one peripheral for which the said packet is intended, and at least one field of a second type including information representative of a path travelled by the said packet from the said source bridge to the said at least one other bridge, means for comparison of the said at least one field of first type with respect to at least one predetermined value known as end-of-transfer value, so as to determine whether the packet received is intended for one of the peripherals linked to the second bus.

Correspondingly, the invention also envisages a device for receiving a data packet transmitted in a communications network including at least two communications buses linked together by at least one bridge, characterised in that it includes means for receiving, within the said bridge, called source bridge, a packet, called response packet, originating from a first bus and sent out by a bridge called destination bridge, in response to a packet called broadcast packet sent out by the said source bridge and including a field of information called identification information including information representing a path travelled by the said broadcast packet up to the said destination bridge, the said response packet including information representing the path which it has travelled from the destination bridge to the source bridge.

The present invention also proposes a method of determining at least one identifier of at least one bridge linking at least one first part of a network to at least one second part of the said network, characterised in that the said method includes the following steps:

determination of at least one characteristic of the said at least one first part of the network to which the said bridge is linked, determination of at least one length of at least one identifier associated with the said at least one first part of the network on the basis of the said at least one characteristic, allocation of at least one identifier having a length which is that which has just been determined to at least one bridge linked to the said at least one first part of the network.

The Applicant has observed that, by allocating to at least one bridge linked to a part of the network an identifier the length of which has been determined on the basis of at least one characteristic specific to this part of the network, the network resources management is improved.

Hence, the length of the identifier is adjusted to avoid the problems of congestion and, for example, makes it possible to increase the number of bridges capable of being crossed by a data packet and/or to increase the number of bridges connected to the same bus.

This identifier allocation also allows optimal use as far as the data rate performance of each part or sub-network of the network is concerned.

The fact of considering at least one characteristic of a part or sub-network of the network in determining the length of the identifier or label of a bridge makes it possible to enhance the performance of this part of the network and to guarantee information transmission in the network at the best data rate.

This simple local evaluation illustrates the simplicity of the step of allocating the bridge identifier in the network in accordance with the invention.

By virtue of the invention, it is not necessary to configure routing tables, and there are no problems relating to the interconnection of several parts or sub-networks of a network.

Advantageously, the determination method according to the invention is not centralised, but is, in contrast, implemented locally on at least one part or sub-network. The invention thus makes it possible to avoid complex management and large-scale protocol exchange.

Correspondingly, the invention envisages a device for determining at least one identifier of at least one bridge linking at least one first part of a network to at least one second part of the said network, characterised in that the said device includes:

means for determining at least one characteristic of the said at least one first part of the network to which the said bridge is linked, means for determining at least one length of at least one identifier associated with the said at least one first part of the network on the basis of the said at least one characteristic, means for allocating at least one identifier having a length which is that which has just been determined to at least one bridge linked to the said at least one first part of the network.

The invention also envisages a bridge linking together at least two parts of a data packet communications network, characterised in that the said bridge includes a device for determining at least one identifier of at least one bridge as set out above.

The advantages and characteristics peculiar to the device for allocating at least one identifier known as routing identifier to at least one bridge in a network, to the interconnection equipment comprising such a device, to the bridge linking together at least two parts of a network and including such interconnection equipment, to the data processing apparatus including such interconnection equipment, being the same as those set out above relating to the method of allocating at least one identifier known as routing identifier to at least one bridge according to the invention, they will not be reiterated here.

DETAILED DESCRIPTION OF THE INVENTION

Figure 1:
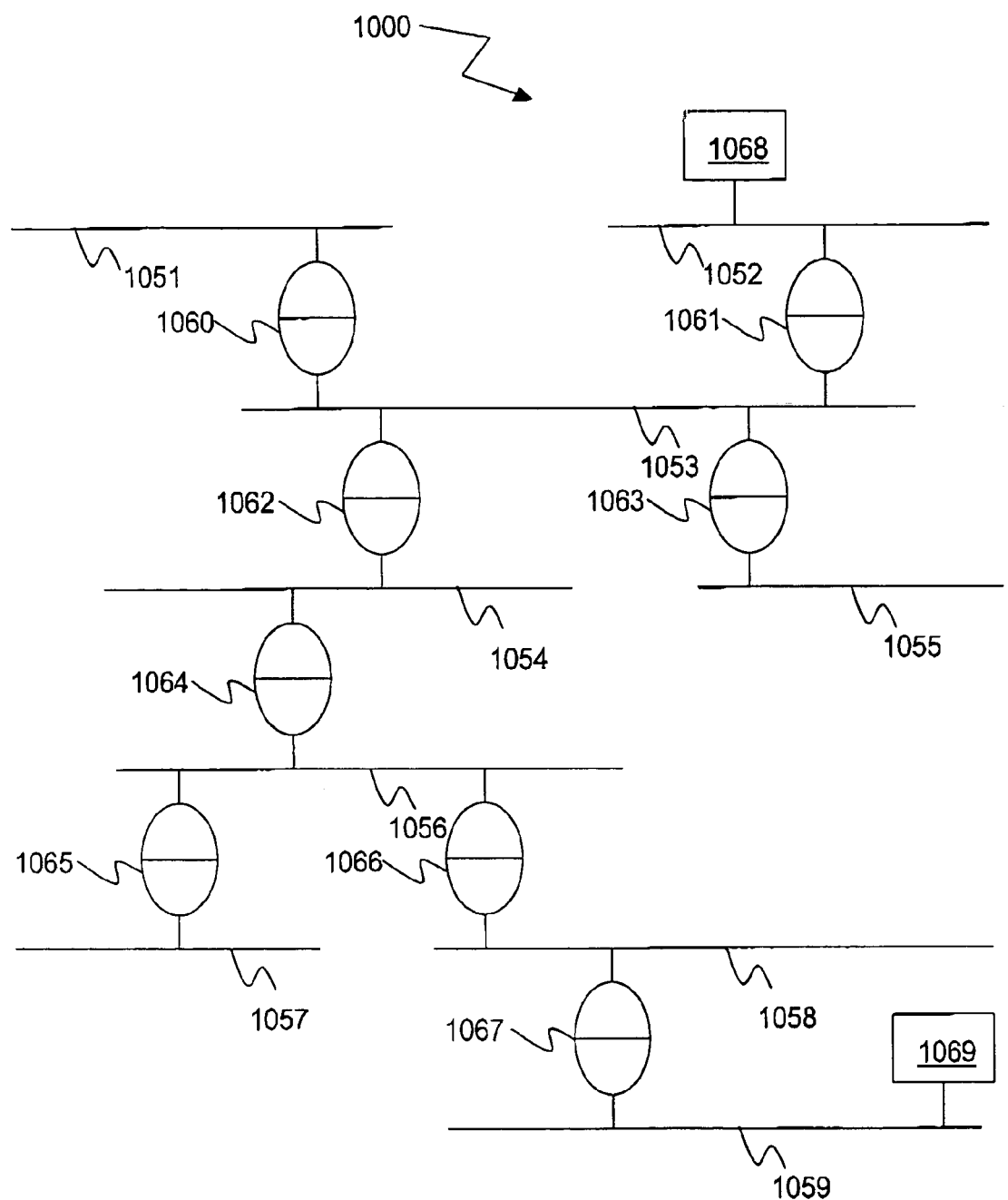
FIG. 1 is a diagrammatic view of a serial communications bus network.

FIG. 1 represents a diagrammatic view of a serial communications bus network in the context of which the invention is applied. A set of serial communications buses 1051, 1052, 1053, 1054, 1055, 1056, 1057, 1058 and 1059, interconnected by several bridges 1060, 1061, 1062, 1063, 1064, 1065, 1066 and 1067, make it possible for peripherals situated on different buses to exchange asynchronous data packets.

Thus a peripheral 1068, connected to the bus 1052, can initiate a transaction with a peripheral 1069 which is itself connected to the bus 1059, by exchanges of asynchronous packets. The transfer of packets from one bus to the other is undertaken by a packet transfer method.

Figure 2:
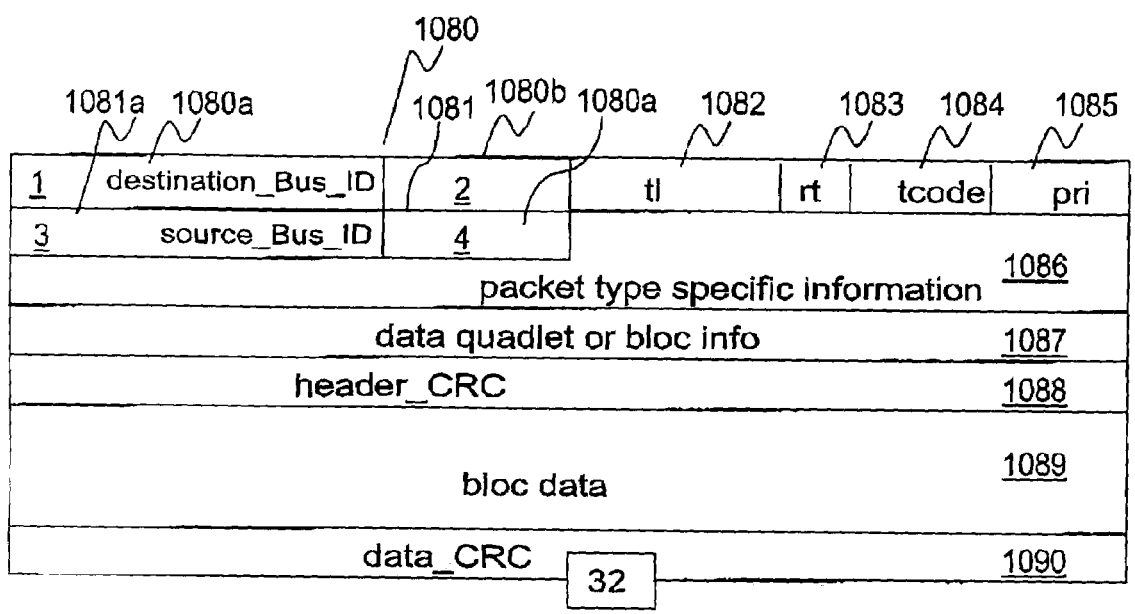
FIG. 2 is a diagrammatic view representing the structure of an asynchronous data packet as defined in the standard IEEE 1394-95.

The structure of an asynchronous packet, extensively described in the IEEE 1394-95 standard, is illustrated in FIG. 2. The asynchronous packets are used, among other things, to carry out transactions between a source peripheral and a destination peripheral. A transaction is carried out by sending out a packet of the "request" type from the source to the destination, then a packet of "response" type from the destination to the source.

The data packet includes a field for information called path identification information, identifying the path of the said packet in the network, which itself includes two fields.

The field "destination_Bus_ID" 1080 of FIG. 2 (Destination Identifier), represented over 16 bits, contains the routing information making it possible to reach the destination peripheral.

This field consists of two sub fields 1080a "destination_Bus_ID", represented over 10 bits, and 1080b "destination_Node_ID" represented over 6 bits.

The field 1080a is called path identification field, identifying the path to be travelled by the data packet.

The field "source_Bus_ID" 1081 (Source Identifier), represented over 16 bits, contains the routing information making it possible to reach the source peripheral.

This field consists of two sub fields 1081a "source_Bus_ID", represented over 10 bits, and 1081b "source_Node_ID" represented over 16 bits.

The field 1081a is called path identification field, identifying the path travelled by the data packet.

The presence of these two fields 1080 and 1081 facilitates the handling of a transaction between the source and the destination.

It should be noted that the two identification information fields of a data packet are not necessarily placed in the header of the said packet, as is the case in this example, but may be located at the opposite end of this packet, that is to say at the end of the packet.

The field "tl" 1082 (Transaction Label), represented over 6 bits, makes it possible to number a transaction between peripherals.

The field "rt" 1083 (Retry Code), represented over 2 bits, makes it possible to identify the attempts to send the same asynchronous packet.

The field "tcode" 1084 (Transaction Code), represented over 4 bits, makes it possible to identify an asynchronous packet type, such as, for example, the type of transaction.

The field "pri" 1085 (Priority), represented over 4 bits, makes it possible to identify the priority associated with the asynchronous packet.

The fields 1086, 1087, 1088, 1089 and 1090 are in some cases optional and relate to the interpretation of the data transported by the asynchronous packet.

Figure 3:
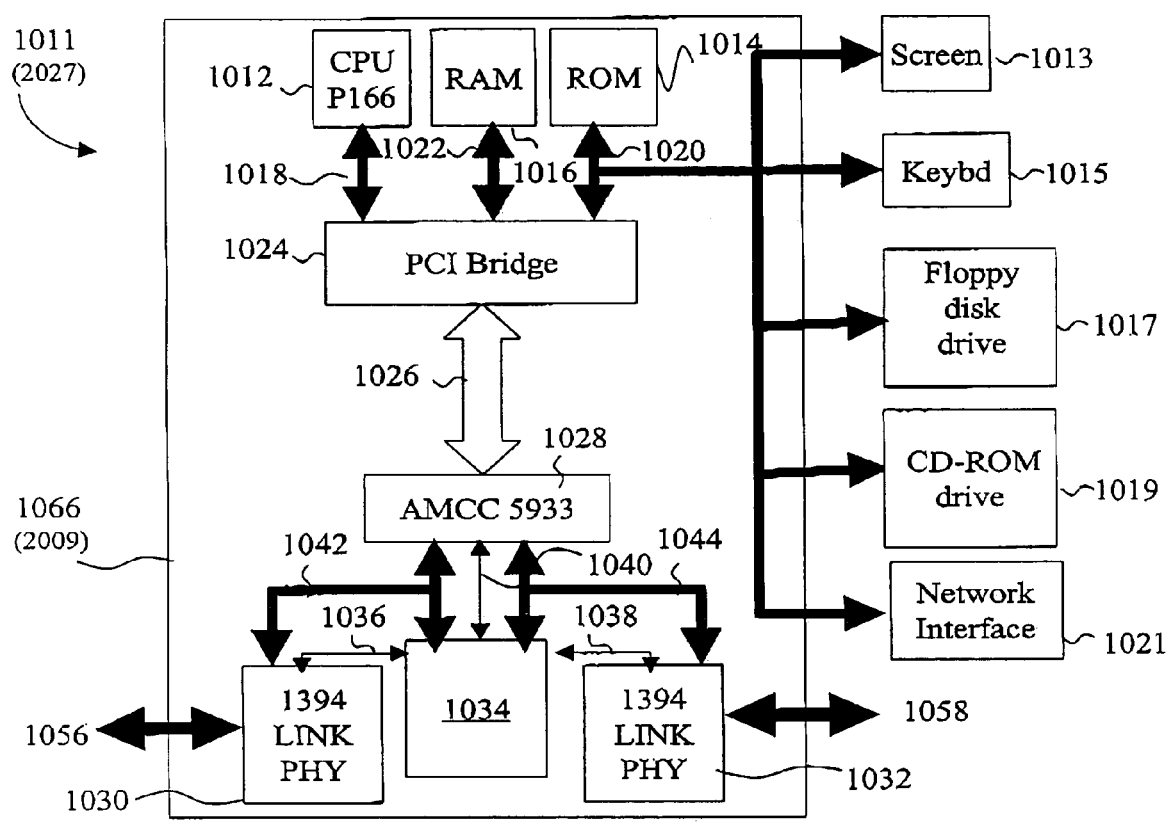
FIG. 3 is a detailed diagrammatic view of a data processing apparatus including a bridge referenced 1066 in FIG. 1.

FIG. 3 represents the diagrammatic structure of a data processing apparatus (programmable apparatus) such as a computer 1011 including, for example, the bridge 1066 represented in FIG. 1. Hence, all the bridges of the network represented in FIG. 1 have this structure, for example.

The data processing apparatus could also take the form of a printer, of a server, of a photocopier, of a scanner, of a video recorder, of a set-top box, of a television set, of a camcorder, of a digital camera or of digital photographic apparatus.

All the bridges of FIG. 1 may be, for example, integrated into a data processing apparatus of this type or else constitute the apparatus itself.

The bridge constitutes, in this example, a packet transfer device. This bridge includes a CPU computing unit 1012, a permanent storage memory 1014 (ROM) which contains the various instructions for the algorithms represented in FIGS. 9, 10, 11, 16, 17, 18, 19, 23, and 24 and a temporary storage memory 1016 (RAM). These three elements 1012, 1014 and 1016 communicate by means of respective data and address buses denoted 1018, 1020, 1022 with a block denoted 1024 and known to the person skilled in the art by the name of bridge PCI.

The computer 1011 also includes a screen 1013, a keyboard 1015, a disk drive 1017, a CD-ROM drive 1019 and a network interface 1021 (FIG. 3).

The network interface 1021 may receive, for example by means of a local area network (not represented) of the Ethernet type, the instructions of a data processing program allowing the method according to the invention to be implemented.

Such instructions may also be contained in the disk drive or the CD-ROM drive.

The block 1024 is in fact a set of PCI components such as the Intel 440LX AGP set (Intel 440LX AGPset) marketed by the INTEL company. Hence, the block 1024 includes, for example, an 82443LX component (not shown) which provides the interface with the memory 1016 via the memory bus 1022 and with the CPU computing unit 1012 via the local bus 1018. The 82443LX component is itself linked to a component 82371AB (not shown) which provides an interface with the ISA bus 1020 linked to the memory 1014 and to the various extensions of peripherals: screen 1013, keyboard 1015, disk drive 1017, CD-ROM drive 1019 and network interface 1021. An Intel 820938AA interrupt controller IOAPIC (not shown) connected to the CPU computing unit 1012 manages the interrupts which may occur in the system.

This block 1024 particularly makes it possible to exchange data by means of the standard PCI bus 1026 (PCI standing for "Peripheral Component Interconnect") with another PCI interface component denoted 1028. The bus 1026 may also connect together other elements, not represented in the Figure, themselves provided with a PCI interface and capable of implementing data processing functions, for example.

The component 1028 is a component known as AMCC5933QC and is marketed by the company Applied Micro Circuits Corporation.

It should be noted that the packet transfer device does not necessarily correspond to the bridge itself. Hence it may, in effect, represent a subset of it formed, for example, by the various elements making it possible to implement the functions of processing the header of a data packet, for taking account of at least one bridge identifier, and of asynchronous packet transfer.

The header processing functions are implemented by the CPU computing unit 1012 and the ROM 1014 and RAM 1016 memories.

The asynchronous packet transfer function, after processing of the header, is implemented by a control logic block 1034 and components 1030, 1032 at the command of the CPU computing unit 1012.

The bridge 1066 represented in FIG. 3 also includes two sets of components also called blocks 1030 and 1032 serving respectively as interfaces with the 1394 serial communications buses, for example denoted 1056 and 1058 in FIG. 1. Each block or assembly of components PHY/LINK 1394 consists, for example, of a component PHYTSB21LV03A and of a component LINK TSB 12LVO1A marketed by the company Texas Instruments and of 1394 connectors, marketed for example by the Molex company, for example under the reference 53462.

The bridge 1066 comprises two items of interconnection equipment of the bridge which each form what is known as a portal.

In FIG. 3, the elements of the bridge which are referenced 1012, 1014, 1016, 1018, 1020, 1022, 1024, 1026, 1028, 1034, 1036, 1038, 1040, 1042 and 1044 are common to each item of interconnection equipment or portals of this bridge and only the PHYLINK 1394 component blocks denoted 1030 and 1032 are specific respectively to each item of interconnection equipment.

However, in some cases, the items of interconnection equipment or portals of a bridge are physically remote (in the case of a radio link) and the other elements mentioned above are thus specific to each of the items of interconnection equipment.

The control logic block denoted 1034 may communicate respectively with the blocks of components 1030 and 1032 by means of buses denoted 1036 and 1038, as well as with the PCI interface component 1028 by means of a bus 1040.

Buses 1042 and 1044 also allow data transfers respectively between the PCI interface component 1028 and the control logic block 1034, as well as the block of 1394 PHY/LINK components referenced 1030, on the one hand, and, on the other hand, with the control logic block 1034 and the block of 1394 PHY/LINK components referenced 1032.

This control logic block 1034 makes it possible to transfer isochronous or asynchronous data packets coming from the serial communications bus 1056 via the block of 1394 PHY/LINK components denoted 1030 which is associated with it and intended for the RAM memory 1016, under the control of the DMA direct-access memory function which is located in the PCI interface component 1028 and which will have been initialised in advance by the CPU computing unit 1012.

Conversely, this block 1034 also makes it possible to transmit isochronous or asynchronous data packets originating from the memory 1016 towards the other 1394 PHY/LINK block denoted 1032, with a view to transmitting it on the serial communications bus which is associated with it. This also takes place under the control of the DMA direct-access memory function mentioned above.

The control logic block 1034 makes it possible moreover to trigger a PCI interrupt relating for example to the receiving or the sending of an asynchronous packet by means of the PCI interface component 1028 so as to inform the CPU computing unit 1012. In the same way, the control logic block 1034 is capable of generating a PCI interrupt for other types of events such as the receiving or the sending of any other data packet on a 1394 bus.

Moreover, the logic block 1034 makes it possible to gain access to the various registers of the blocks of components 1030 and 1032 via the PCI interface component 1028.

The control logic block 1034 is a component of the FPGA (Field Programmable Gate Array) type which is marketed, for example, by the company Xilinx.

Figure 4:
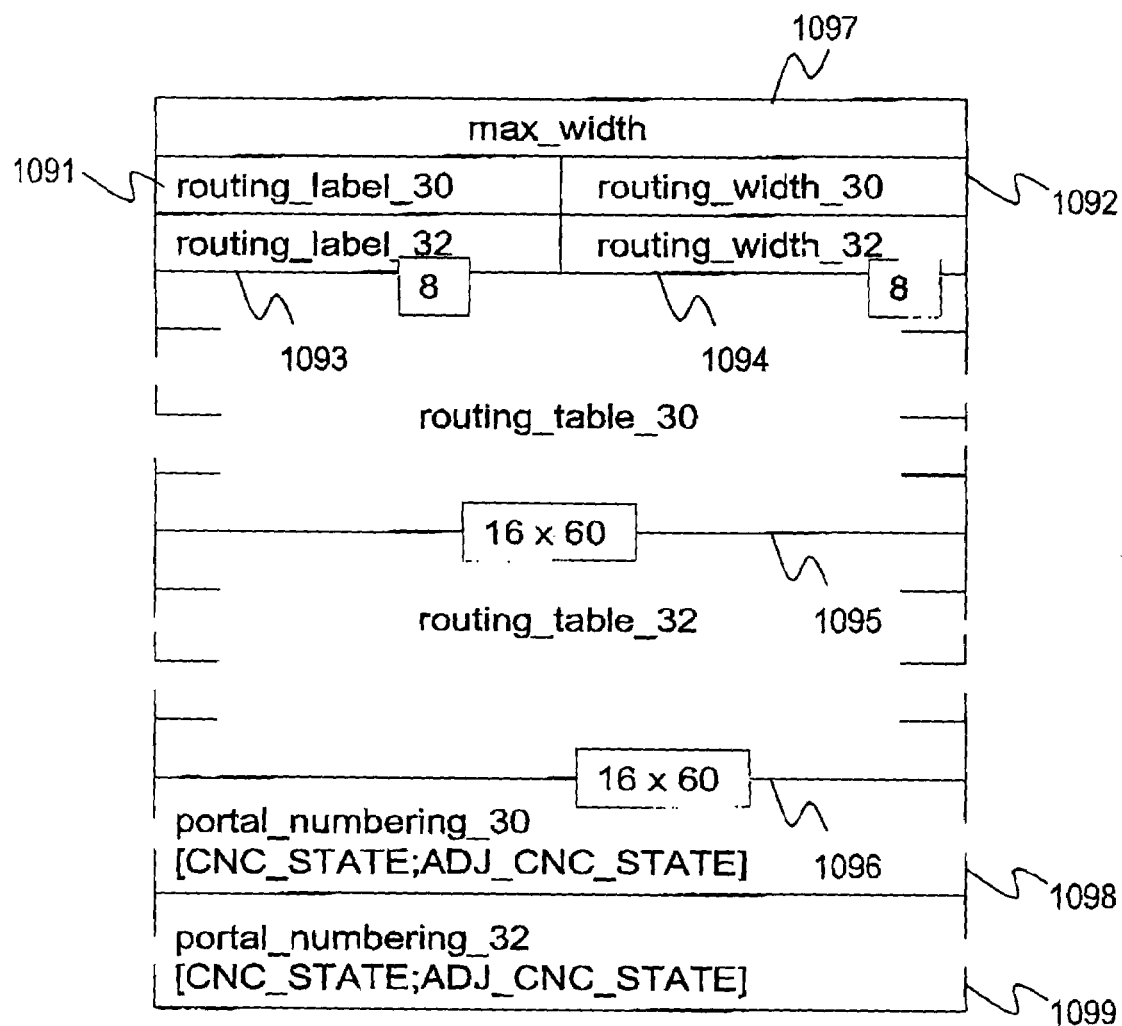
FIG. 4 is a diagrammatic view representing various registers stored in the RAM memory of the data processing apparatus of FIG. 3.

Each block of components 1030 and 1032 is associated with the registers represented in FIG. 4, which are used to implement the data packet transfer method.

In the description which follows, a register whose name is suffixed by "_30" or "_32" belongs to the respective blocks 1030 and 1032 described previously with reference to FIG. 3.

A register 1091, called "routing_label_30", represented over 8 bits, contains a routing address or identifier which identifies the packets which have to be transferred from the bus 1056 to the bus 1058 in the example of the bridge 1066.

A register 1092, called "routing_width_30", represented over 8 bits, is associated with the register 1091 and indicates the number of significant bits of the register 1091. The registers 1091 and 1092 are associated with the component block 1030.

A register 1093, called "routing_label_32", represented over 8 bits, contains a routing address or identifier which identifies the packets which have to be transferred from the bus 1058 to the bus 1056 in the example of the bridge 1066.

A register 1094, called "routing_width_32", represented over 8 bits, is associated with the register 1093 and indicates the number of significant bits of the register 1093. The registers 1093 and 1094 are associated with the component block 1032.

A register 1097, called "max_width", represented for example over 32 bits, contains the maximum value which the registers 1092 and 1094 may take. This register is therefore not associated with any item of equipment or portal in particular. At a given instant, it contains the same value in each bridge of the network in question.

In the preferred embodiment, the value of the registers 1092, 1094 and 1097 is predetermined and equal to "3" for each register.

Among the set of items of interconnection equipment or portals connected to the same 1394 bus, the standard P1394.1 provides for one particular item of interconnection equipment to be determined, called "alpha portal".

The means of determining the "alpha portal" are known and described particularly in chapter 4.1 of the draft P1394.1 standard version 0.04 of 7 Feb. 1999. These means particularly make it possible to identify, in a constant and unique way, the peripherals of the same bus. By extension, these means also make it possible to allocate a constant and unique routing label or identifier in the same way to each item of interconnection equipment or portal of the same bus.

It should be noted that each item of equipment (peripheral, interconnection equipment, etc.) connected to a bus is indicated by an identifier called a physical identifier and by an identifier called a virtual identifier.

The correspondence between the physical identifier and the virtual identifier of an item of equipment is established in a correspondence table such as that shown in FIG. 21 and to which we will return in more detail later.

The value of the virtual identifier of an item of equipment connected to a bus remains constant even if the topology connected to this bus is modified.

In this way, seen from outside the bus, the values of the virtual identifiers do not change despite a modification to the topology of the bus in question.

Moreover, the items of interconnection equipment connected to a bus also have the routing identifier mentioned above.

A routing identifier thus determined, for example with respect to the interconnection equipment of the bridge 1066 which is connected to the bus 1056, is stored in the register 1091 and identifies the interconnection equipment or portal containing the block 1030 of FIG. 3. Likewise, a routing identifier thus determined, for example with respect to the interconnection equipment of the bridge 1066 which is connected to the bus 1058, is stored in the register 1093 and identifies the interconnection equipment or portal containing the block 1032 of FIG. 3.

A register 1095, called "routing_table_30, in FIG. 4, represented over 960 bits, represents a routing table associated with the interconnection equipment or portal containing the block 1030 and is used when transferring packets sent from the bus 1056, as far as the bridge 1066 is concerned.

A register 1096, called "routing_table_32", represented over 960 bits, represents a routing table associated with the interconnection equipment or portal containing the block 1032 and is used when transferring packets sent from the bus 1058, as far as the bridge 1066 is concerned. The structure of this routing table is described in detail in FIG. 8.

A register 1098, called "portal_numbering_30", in FIG. 4 comprises, on the one hand, at least one correspondence table whose structure will be described later with reference to FIG. 21 and which is associated with the interconnection equipment or portal containing the block 1030 and, on the other hand, two registers denoted "CNC_STATE" and "ADJ_CNC_STATE".

A register 1099, called "portal_numbering_32", in FIG. 4 comprises, on the one hand, at least one correspondence table whose structure will be described later with reference to FIG. 21 and which is associated with the interconnection equipment or portal containing the block 1032 and, on the other hand, two register denoted "CNC_STATE" and "ADJ_CNC_STATE".

The registers 1091, 1092, 1093, 1094, 1095, 1096, 1097, 1098 and 1099, represented in FIG. 4, are located in the RAM memory 1016 of the bridge 1066 represented in FIG. 3.

An asynchronous packet, sent by a source peripheral situated on a different bus to the one on which the destination peripheral is situated, is called a distant asynchronous packet, in contrast to a local asynchronous packet.

Moreover, when a distant asynchronous packet transits, for example from the peripheral 1068 (FIG. 1) to the peripheral 1069, via the bridges 1061, 1062, 1064, 1066 and 1067, different processing operations are applied by each of these bridges depending on their relative position with respect to the source peripheral and the destination peripheral.

Hence, when none of the items of interconnection equipment or portals of a bridge in question is connected neither to the bus of the source peripheral, nor to the bus of the destination peripheral, the bridge is said to be an intermediate bridge. This is the case for the bridge 1066 when, for example, the peripheral 1068 transmits an asynchronous packet to the peripheral 1069.

Figure 5:
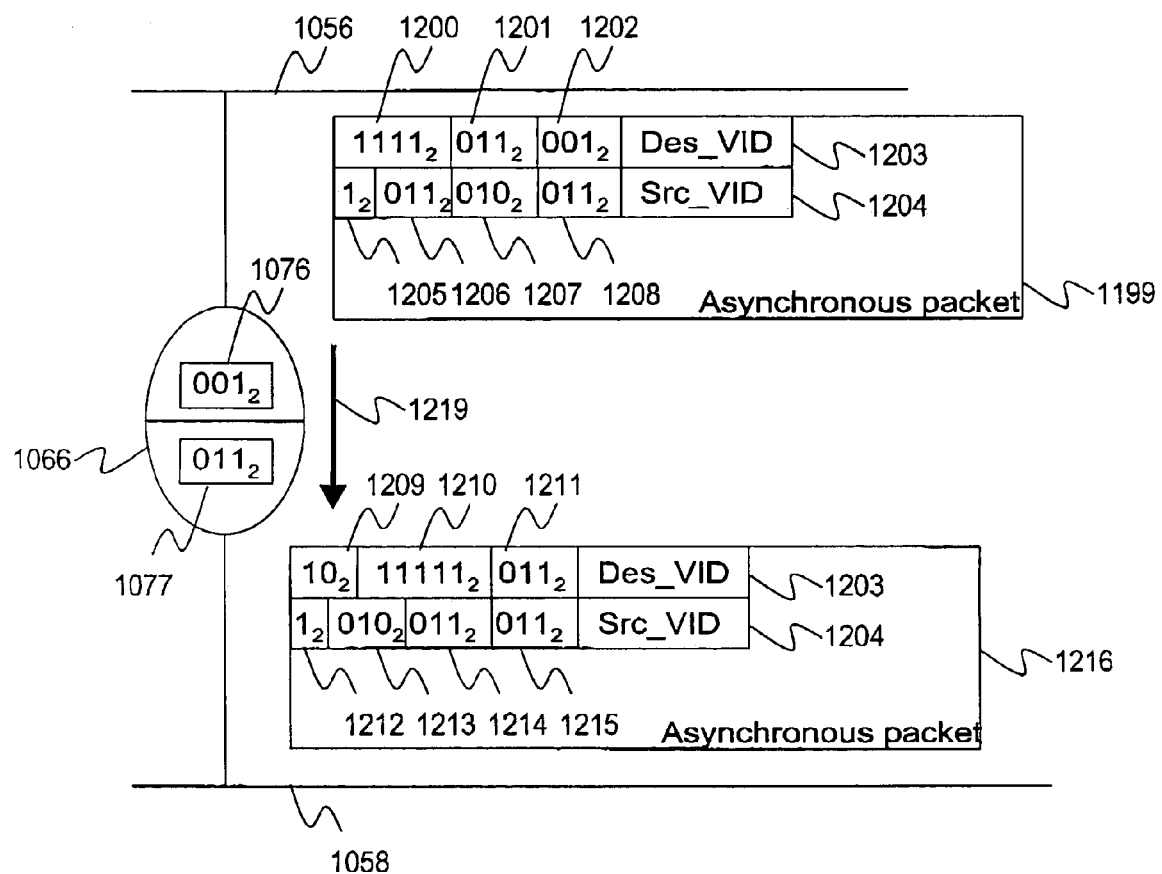
FIG. 5 is a diagrammatic view illustrating the transfer of a data packet across the intermediate bridge referenced 1066 in FIG. 1.

FIG. 5 diagrammatically illustrates the processing which the bridge 1066 carries out as an intermediate bridge, on the fields 1080 and 1081 of the asynchronous packet which it is transferring from the bus 1056 to the bus 1058, according to the direction indicated by the arrow 1219.

The register 1076 is the equivalent of the register 1091 represented in FIG. 4 and has, for example, the value of 001 in binary representation over 3 significant bits.

Moreover, the register 1077 is the equivalent of the register 1093 represented in FIG. 4 and has, for example, the value of 011 in binary representation over 3 significant bits.

Figure 16:
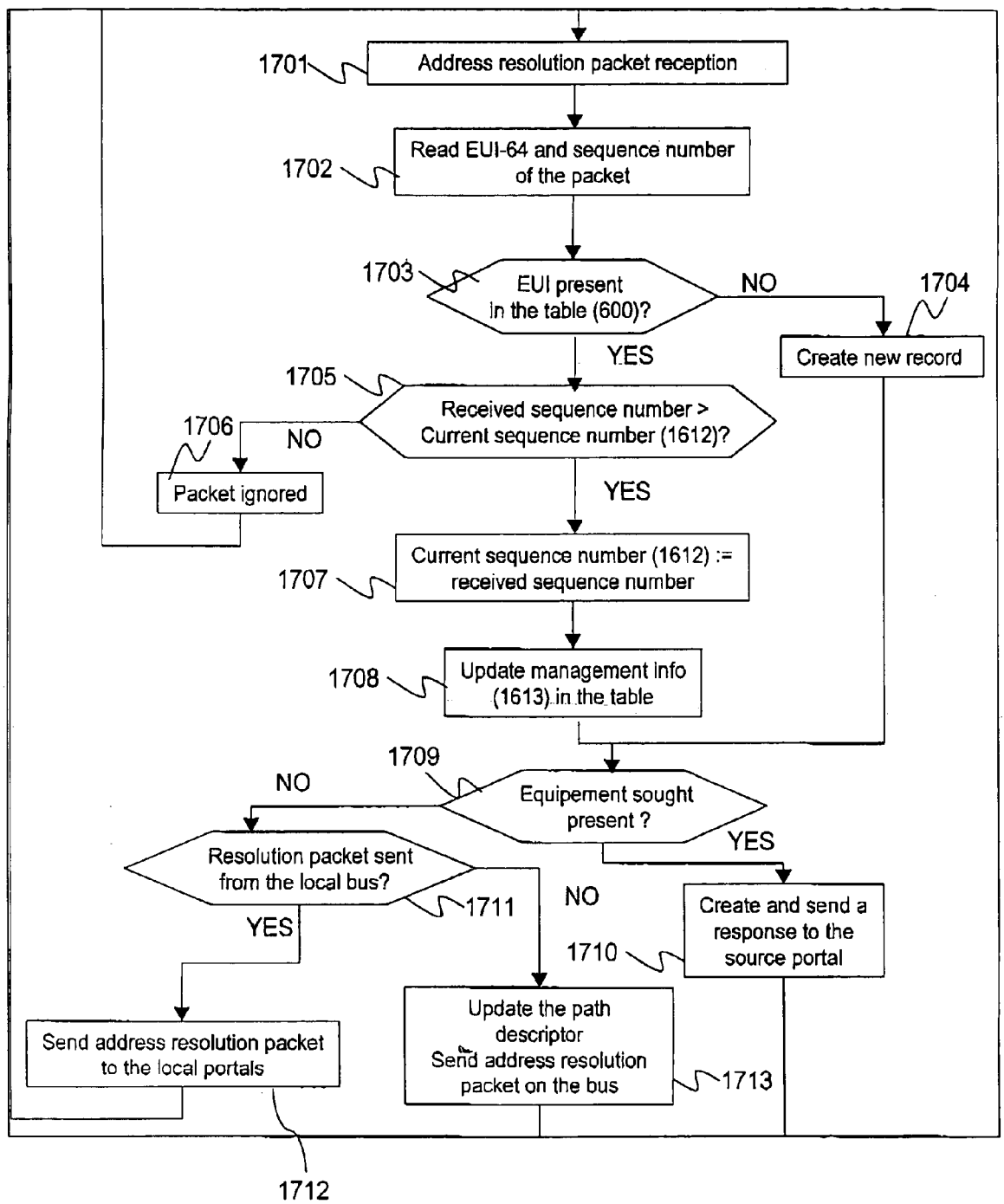
FIG. 16 is a diagrammatic view of the algorithm of a method of receiving an address resolution packet within an item of interconnection equipment of a bridge.
Figure 17:
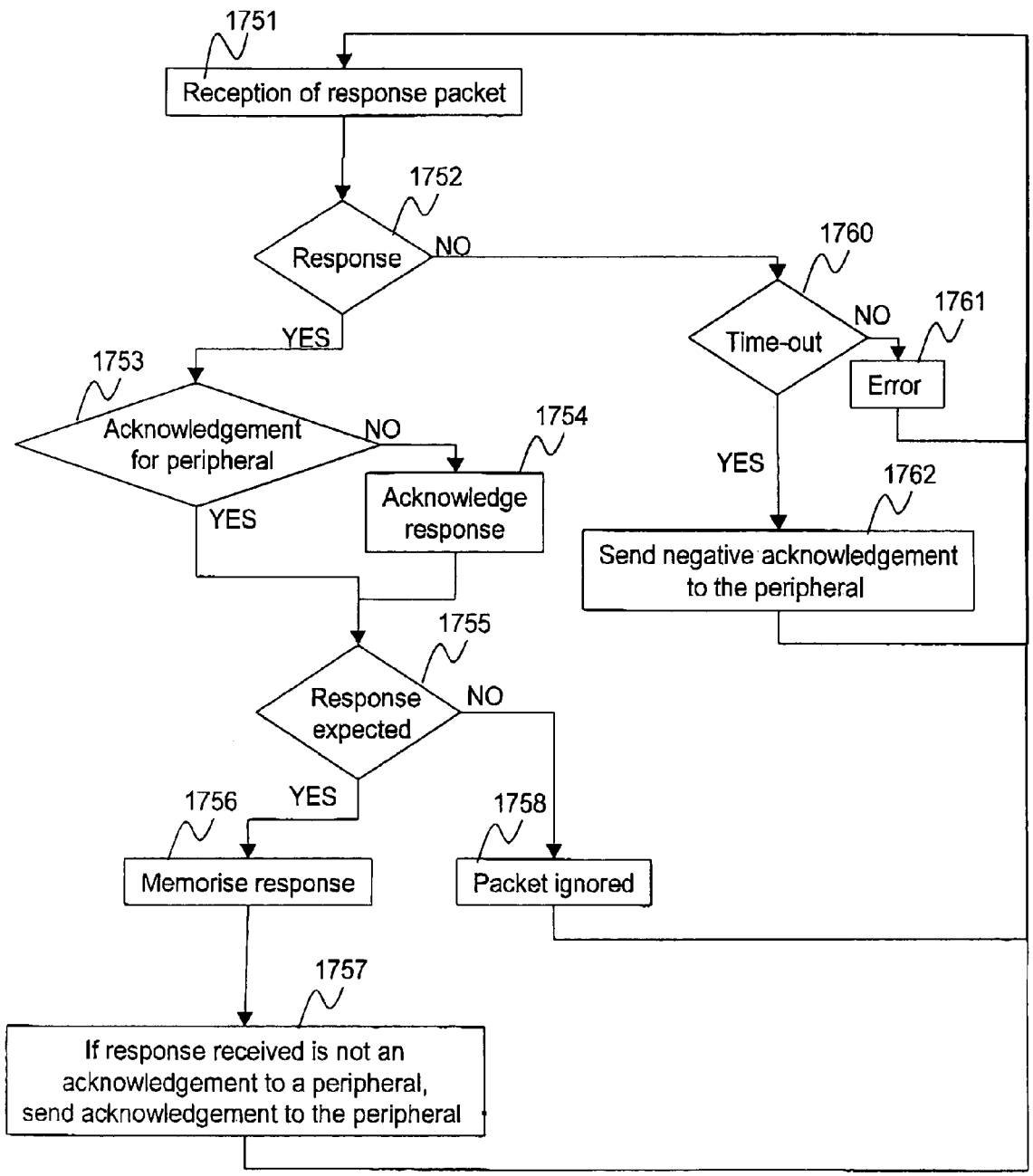
FIG. 17 is a diagrammatic view of the algorithm of a method of receiving a data packet in response to the address resolution packet within an item of interconnection equipment of a bridge.

By reference to FIGS. 16 and 17, the transfer of an asynchronous data packet denoted 1199 from the bus 1056 to the peripheral 1069 of the bus 1059 will now be examined.

The asynchronous data packet 1199 transits on the bus 1056 and is transferred to the bus 1058, via the bridge 1066, after processing, in the form of a packet 1216. The asynchronous packets 1199 and 1216 are in accordance with the packet structure represented in FIG. 2 and differ from one another only in the content of their respective destination 1080 and source 1081 fields.

The field 1080 of the packet 1199 is broken down into several fields denoted 1200, 1201, 1202 and 1203. The field 1081 of the packet 1199 is itself also broken down into several fields denoted 1204, 1205, 1206, 1207 and 1208.

The fields 1201 and 1202, both represented over 3 bits, contain the addresses or routing identifiers of the items of interconnection equipment or portals to be taken into account respectively by the bridges 1066 and 1067 in order to transfer the asynchronous packet to the destination peripheral 1069.

The fields 1208, 1207 and 1206, each represented over 3 bits, contain the addresses or routing identifiers of the items of interconnection equipment or portals to be taken into account respectively by the bridges 1064, 1062 and 1061 in order to transfer an asynchronous packet back to the source peripheral 1068.

The field 1203, represented over 6 bits, contains the information which allows the bridge 1067 to identify the destination peripheral 1069 of the asynchronous packet among all the peripherals of the bus 1059.

In a general way, it is a case of the field 1080*b* "destination_Node_ID" in FIG. 2.

The field 1204, represented over 6 bits, contains the information which allows the bridge 1061 to identify the source peripheral 1068 of the asynchronous packet among all the peripherals of the bus 1052.

In a general way, it is a case of the field 1081 *b* "source_Node_ID" in FIG. 2.

The fields 1200 and 1205, the combination of which is represented over 5 bits and which are all set to 1, contain a marker delimiting the fields 1202 and 1201, on the one hand, from the fields 1208, 1207 and 1206 on the other hand.

The fields 1201 and 1202 form what are called a first information field and identify the path which is to be travelled by the data packet 1199.

The fields 1206, 1207 and 1208 form what is called a second information field and identify the path already travelled by the data packet 1199.

It is to be noted that the first and second fields within the meaning of the invention can include the fields 1204 and 1203 respectively.

The fields 1200 and 1205 form what is called a third information field or marker.

In the case of the packet 1216 coming from the bridge 1066, the field 1080 comprises the fields 1209, 1210, 1211 and 1203 and the field 1081 comprises the fields 1212, 1213, 1214, 1215 and 1204.

The field 1211, represented over 3 bits, contains the routing identifier to be taken into account by the bridge 1067 in order to transfer the asynchronous packet to the destination peripheral 1069. It corresponds to the field 1201 of the packet 1199.

The fields 1215, 1214 and 1213, each represented over 3 bits, as well as the fields 1209 and 1212, all of which are represented over 3 bits, contain the routing identifiers to be taken into account respectively by the bridges 1066, 1064, 1062 and 1061, in order to transfer the asynchronous packet back to the source peripheral 1068. The fields 1213 and 1214 correspond respectively to the fields 1207 and 1208 of the packet 1199. The fields 1209 and 1212 correspond to the field 1206 of the packet 1199.

The field 1210, represented over 5 bits, which are all set to 1, contains the marker delimiting the field 1211, on the one hand, from the fields 1209 to 1215 on the other hand. It corresponds to the fields 1205 and 1200 of the packet 1199.

Upon reception of the packet 1199, the bridge 1066 reads and analyses the value of the field 1202 which it compares with the content of the register 1076. Since the two values, expressed over the same number of significant bits, are identical, the packet 1199 will be transferred from the bus 1056 to the bus 1058 in the form of the packet 1216.

Figure 6:
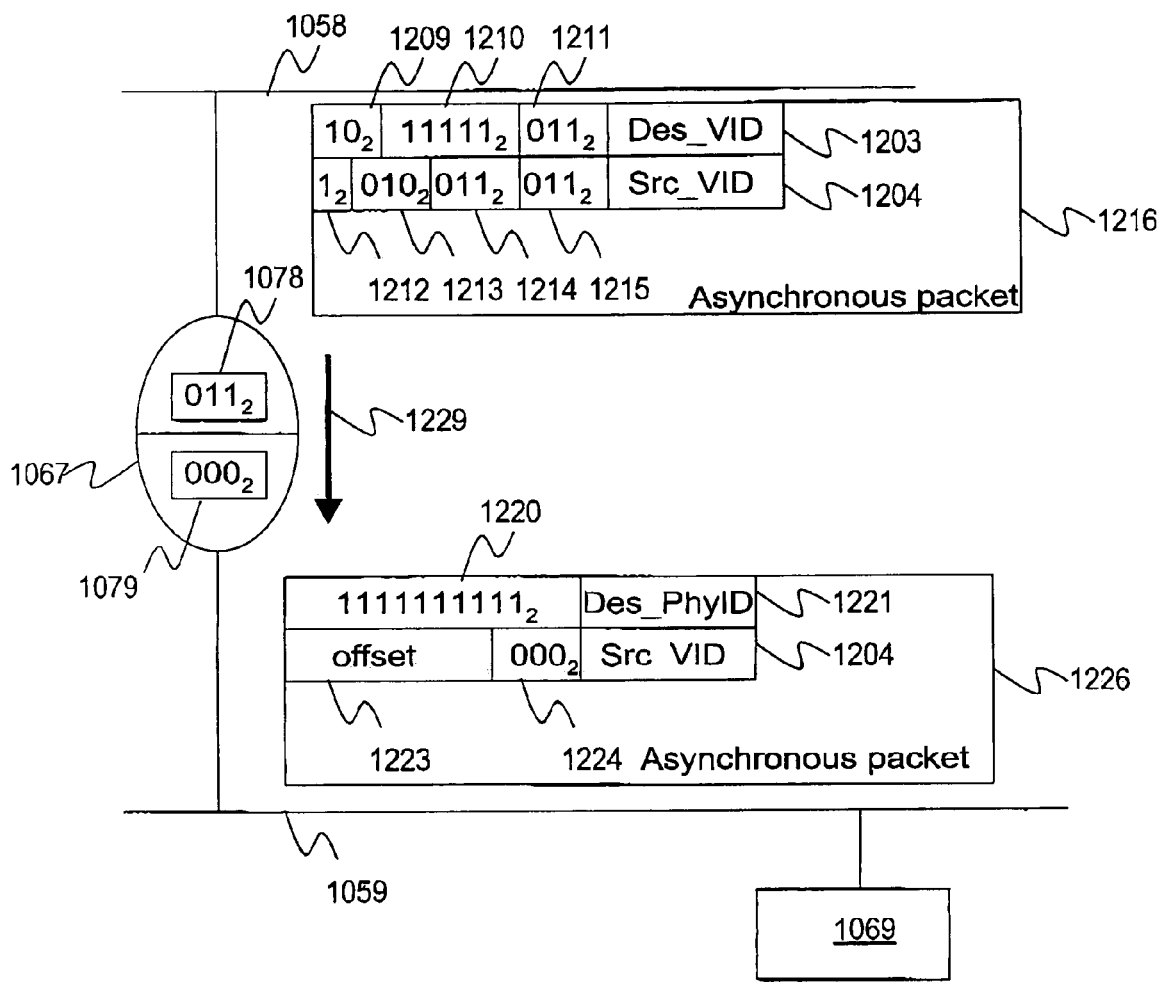
FIG. 6 is a diagrammatic view illustrating the transfer of a data packet across the destination bridge referenced 1067 in FIG. 1.
Figure 7:
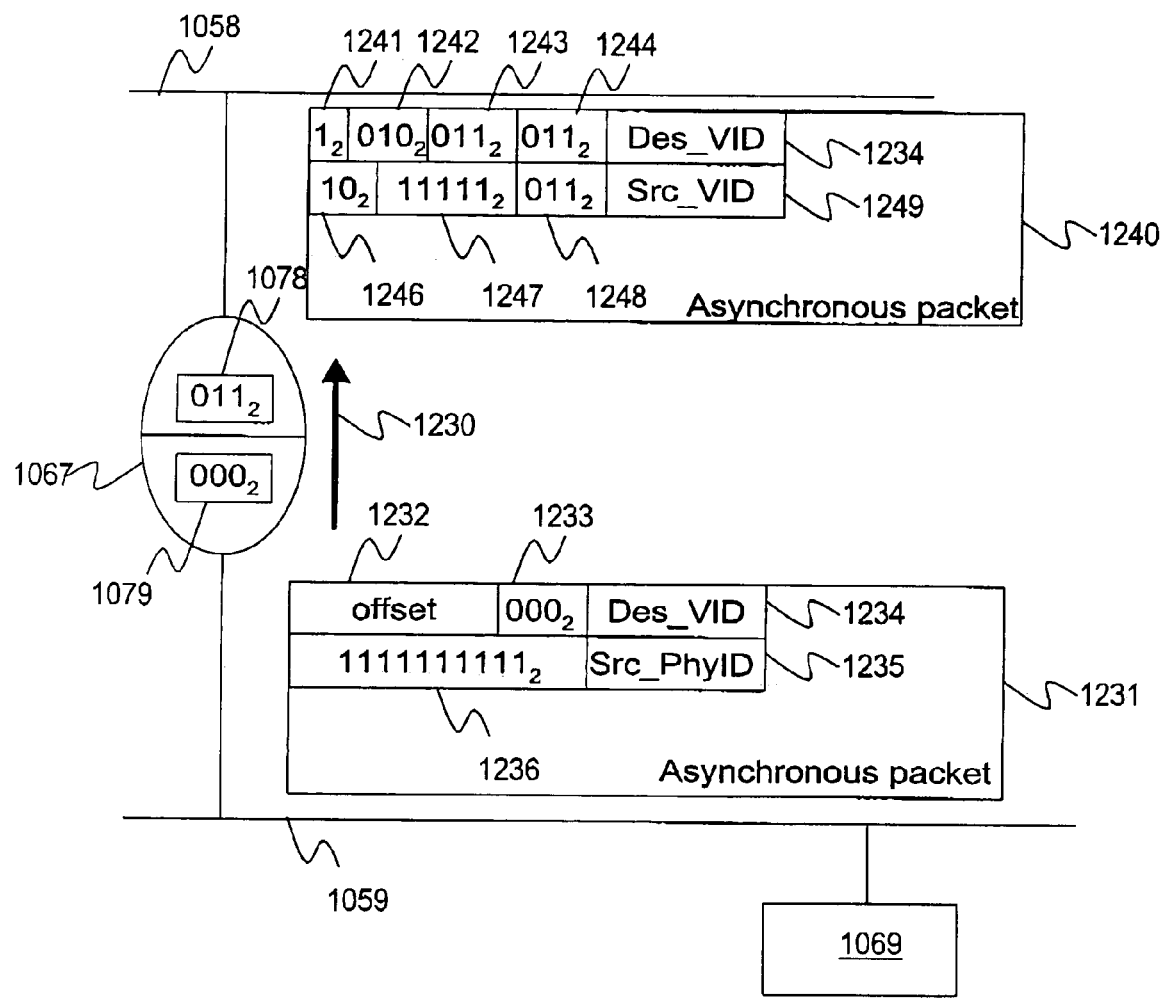
FIG. 7 is a diagrammatic view illustrating the transfer of a data packet across the source bridge referenced 1067 in FIG. 1.

Each bridge, such as those of FIGS. 6 and 7 for example, implements the method according to the invention.

Thus, after the above-mentioned reading step, the method according to the invention determines whether the position of the data packet in the network corresponds to that of one of the two bridges called end bridges and which are situated at the two ends of the path of the data packet.

To do this, a comparison is made of at least one item of information from the identification information field and, for example, the information from the information field (marker 1200, 1205) with at least one predetermined information item which is contained in the ROM memory of the bridge in question.

In general, the predetermined information corresponds to the configuration and to the content of the second information sub-field in the identification information field when the packet is at one of the two end bridges.

In practice, a mask is formed, for example by means of a logic "AND" function, in order to make this comparison.

In the example of FIG. 5, this determination step does not make it possible to determine that the data packet is in one of the two above-mentioned positions.

It will be noted that, between the packet 1199 and the packet 1216, the bridge 1066 has, on the one hand, deleted from the first information a first item of information consisting of the bits 001 belonging to the field 1202 and, on the other hand, has added to the second information a second item of information consisting of the bits 011 of the register 1077 for identification of the interconnection equipment or portal in question.

In FIG. 5 it should be noted that, on the one hand, the deletion of a first item of information (field 1202) from the first information field reduces the length of the field and, on the other hand, the addition of a second item of information (field 1215) in the second information field increases the length thereof.

This second item of information is represented by the field 1215.

The packet transfer method, after the deletion of the first item of information and before the addition of the second item of information, also carries out the shifting of the first, second and third information fields within the sub fields 1080a and 1081a of the fields 1080 and 1081.

When one of the items of interconnection equipment or portals of a bridge is connected to the bus of the destination peripheral, the bridge is said to be a destination bridge. This is the case, for example, for the bridge 1067 of FIG. 1 when the peripheral 1069 receives a distant asynchronous packet originating from the peripheral 1068.

FIG. 6 diagrammatically illustrates the processing which the bridge 1067 carries out as destination bridge on the fields 1080 and 1081 of the asynchronous packet 1216 which it is transferring from the bus 1058 to the bus 1059, in the direction indicated by the arrow 1229.

The register 1078 illustrates, in the case of the bridge 1067, the register 1091 represented in FIG. 4, the value of which, over 3 significant bits, is 011 in binary representation. Moreover, the register 1079 illustrates, in the case of the bridge 1067, a register 1093 represented in FIG. 4, the value of which, over 3 significant bits, is 000 in binary representation.

The asynchronous packet 1216 which transits on the bus 1058 is transmitted on the bus 1059, via the bridge 1067 after processing, in the form of a packet 1226. The asynchronous packets 1216 and 1226 are in accordance with the packet structure represented in FIG. 2 and differ from one another only in the contents of their respective fields 1080 and 1081.

In the case of the packet 1226, the field 1080 is broken down into several fields 1220 and 1221 and the field 1081 is itself also broken down into several fields 1223, 1224 and 1204.

The field 1220, represented over 10 bits which are all set to 1, is representative of an asynchronous packet intended for the local bus and capable of being received by one of the peripherals of the bus 1059.

The field, called "offset" field and denoted 1223, is added by the bridge 1067, whereas the field 1224 contains the address or routing identifier of the interconnection equipment or portal of the bridge 1067 associated with the bus 1059 and stored in the register 1079.

Upon reception of the packet 1216, the bridge 1067 reads and analyses the value of the field 1211 which it compares with the content of the register 1078. Since the two values, expressed over the same number of significant bits, are identical, the packet 1216 will be transferred from the bus 1058 to the bus 1059 in the form of the packet 1226.

Upon the transfer of the packet 1216 across the bridge 1067, the latter has deleted from a first information field which is formed from the field 1211, and possibly from the field 1203, a first item of information consisting of the bits 011 of the field 1211 itself.

This first information field identifies the path remaining to be travelled for the packet 1216 in order to reach its destination.

The bridge 1067 has next added in a second information field which is formed by the fields 1213, 1214 and 1215, and possibly by the field 1204, a second item of information consisting of the bits 000 of the register 1079 for identification of the interconnection equipment or portal in question. This second item of information is represented by the field 1224.

This second information field identifies the path which the packet 1216 has travelled and this will be the path called the "return path" which will allow it, if appropriate, to be sent back to the source peripheral.

The third information field corresponds to the marker denoted 1210 and explained above.

The method according to the invention determines whether the position of the data packet in the network corresponds to that of one of the two bridges called end bridges and which are situated at the two ends of the path of the data packet.

In order to do this, at least one item of information from the identification information field and, for example, the information from fields called marker (1210, 1220) are compared with that at least one predetermined item of information which is contained in the ROM memory of the bridge in question.

In the example of FIG. 6, the comparison step results in identity between the information of the field 1210 which is not representative of the path of the packet and the predetermined information mentioned above.

Consequently, the data packet 1216 is at one of the end bridges 1067 called "destination" bridges (FIG. 1) which are arranged at the two ends of the path of the said packet.

The method according to the invention thus makes provision to make a modification to the identification information field, this modification matching the position of the packet in the network.

Certain steps of the method will be described in more detail with reference to FIGS. 8 to 10.

However, it may be observed here that the step of modification of the identification information field consists in writing, in place of fields 1209, 1212, 1213, 1214, 1215 an index (offset) 1223 which is associated in the bridge with the information from routing identifiers to be taken into account for the return path of the packet and which replaces them in the packet 1226 (FIG. 6).

The modification also consists in increasing the size of the field 1210 in order to be able to write into it information characteristic of the destination peripheral 1069 (bits all set to "1"), transferring it into field 1220.

In this way, the data packet 1226 will be recognised by the destination peripheral 1069.

The packet transfer method, after the deletion of the first item of information and before the addition of the second item of information, also carries out the saving of the second information field, the storage of the index corresponding to this saving within the field 1223 and the setting to "1" of all the bits of the field 1220.

The field 1203, represented over 6 bits, allows the destination bridge 1067 to identify the destination peripheral 1069 of the asynchronous packet from among all the peripherals of the bus 1059. The field 1203 of the packet 1216 has been replaced, upon the transfer in the bridge 1067, by the field 1221 in the packet 1226. The field 1221 identifies, for example, the peripheral 1069 from among all the peripherals of the bus 1059, so that the packet 1226 is received by the peripheral 1069.

The field 1203 contains the virtual identifier of the peripheral 1069, whereas the field 1221 contains the physical identifier of the peripheral 1069.

The field 1204, represented over 6 bits, contains the information which allows the bridge 1061 to identify the source peripheral 1068 sending the asynchronous packet among all the peripherals of the bus 1052.

The field 1204 represents the virtual identifier of the peripheral 1068.

When one of the items of interconnection equipment or portals of a bridge is connected to the bus of the source peripheral, the bridge is called source bridge. This is the case for example for the bridge 1067 of FIG. 1 when the peripheral 1069 transmits a distant asynchronous packet intended for the peripheral 1068, for example in response to the packet 1226.

FIG. 7 diagrammatically illustrates the changes made by the bridge 1067 as source bridge, on the fields 1080 and 1081 of an asynchronous packet which it transfers from the bus 1059 to the bus 1058, in the direction indicated by the arrow 1230.

The asynchronous packet 1231 sent on the bus 1059 by the peripheral 1069 is transferred onto the bus 1058, via the bridge 1067, after processing, in the form of a packet 1240. The asynchronous packets 1231 and 1240 are in accordance with the packet structure represented in FIG. 2 and differ from one another only in the content of their respective fields 1080 and 1081.

In the case of the packet 1231, the destination field 1080 is broken down into several fields 1232, 1233 and 1234 and the source field 1081 is also broken down into several fields 1235 and 1236.

The field called "offset" field and denoted 1232 is used by the bridge 1067 in order to recover all the routing identifiers to be taken into account, respectively by the bridges 1066, 1064, 1062 and 1061, in order to transfer the asynchronous packet to the destination peripheral 1068. The field 1233 contains the routing identifier of the bridge 1067 associated with the bus 1059 and stored in the register 1079.

The field 1236, represented over 10 bits, which are all set to 1, is representative of an asynchronous packet sent out by the local bus.

This field contains information not representative of the path of the data packet and which is, more precisely, characteristic of the peripheral 1069 from which the packet originates.

In the case of the packet 1240, the destination field 1080 is broken down into several fields 1241, 1242, 1243, 1244 and 1234, and the source field 1081 is also broken down into several fields 1246, 1247, 1248 and 1249.

The fields 1244, 1243 and 1242, each represented over 3 bits, as well as the fields 1241 and 1246, together represented over 3 bits, contain the addresses or routing identifiers of the items of interconnection equipment or portals to be taken into account respectively by the bridges 1066, 1064, 1062 and 1061, in order to transfer the asynchronous packet to the destination peripheral 1068.

The field 1248, represented over 3 bits, contains the routing identifier to be taken into account by the bridge 1067 in order to transfer the asynchronous packet back to the source peripheral 1069.

The field 1247, represented over 5 bits, all the bits of which are set to 1, contains a marker delimiting the fields 1241 to 1244, 1234 and 1246, on the one hand, from the field 1248 on the other hand.

Upon reception of the packet 1231, the bridge 1067 reads and analyses the value of the field 1233 which it compares with the content of the register 1079. Since the two values, expressed over the same number of significant bits, are identical, the packet 1231 will be transferred from the bus 1059 to the bus 1058 in the form of the packet 1240.

It will be noted that, in the packet 1240, the routing identifiers 1241, 1242, 1243, 1244 and 1246 representative of the path to be travelled to the destination peripheral 1068 and the field 1248 representative of the path travelled from the source peripheral 1069 have been initialised by the bridge 1067 in the packet 1240.

To do that, the bridge uses the value stored in the offset field 1232 of the packet 1231 which it will have previously communicated to the source peripheral 1069, by means of an asynchronous packet, for example. Hence, if, for example, the packet 1231 of FIG. 7 constitutes the response of the peripheral 1069 to the packet received 1226 in FIG. 6, it will be noted that the value of the fields 1223 and 1224 of the data packet 1226 is identical respectively to the value of the fields 1232 and 1233 of the packet 1231 of FIG. 7.

It will also be noted that, in this case, the value of the fields 1209, 1210, 1211 of the packet 1216 of FIG. 6 is equal respectively to the value of the fields 1246, 1247 and 1248 of the packet 1240 of FIG. 7. Likewise, the value of the fields 1212, 1213, 1214 and 1215 of the packet 1216 is equal respectively to the value of the fields 1241, 1242, 1243 and 1244 of the packet 1240.

Upon the transfer of the packet 1231 across the bridge 1067, the latter has added the first information field which is formed from the fields 1244, 1243, 1242, 1241 and 1246. This first information field identifies the path remaining to be travelled for the data packet 1231 in order to reach its destination.

The bridge 1067 has next added in a second information field which is empty prior to this addition a second item of information consisting of the bits 011 of the register 1078 for identification of an item of interconnection equipment or portal in question. This second item of information is represented by the field 1248.

This second information field identifies the path which the packet 1231 has travelled from the peripheral 1069 and this will be the information path called the "return path" which will allow it, if appropriate, to be sent back to the source peripheral.

The third information field corresponds to a part of the field 1236 which is converted in the packet 1240 into a field 1247 called marker.

The packet transfer method, after the deletion of the first item of information and before the addition of the second item of information, also carries out the reading of the routing table associated with the interconnection equipment of the register 1079.

The content of the field 1235 which is coded in 6 bits, represents the physical identifier of the peripheral 1069 among all the peripherals of the bus 1059. The field 1235 has been replaced by the field 1249 within the packet 1240. The value of field 1249 represents the virtual identifier of the peripheral 1069 among all the peripherals of the bus 1059.

The field 1234 which is coded in 6 bits represents the virtual identifier of the destination peripheral 1068 of the asynchronous packet among all the peripherals of the bus 1052.

It will be noted that the value of the field 1234 equals to the value of the field 1204 in FIGS. 5 and 6. Likewise, the value of the field 1249 equals to the value of the field 1203 in FIGS. 5 and 6 and the values of the field 1235 equals to the value of the field 1221 in FIG. 6.

Hence, it will be understood that, upon the transfer of a packet by an intermediate bridge, the routing identifier of the interconnection equipment or portal by which the packet arrives is deleted from the first information field since its usefulness is over, and the routing identifier of the interconnection equipment or portal by which the packet leaves the bridge is added in a second information field so as to reconstruct the path travelled by the packet.

It will also be noted that in accordance with the packet transfer method the first second and third fields are shifted.

With the two identifiers having the same length, the total length of the first, second and third information fields (FIG. 5) remains unchanged.

By reducing the length of the first field and by increasing the length of the second field in step with the transfer of the packet by various bridges on the network, it is thus possible to increase the maximum distance travelled by a packet with respect to the prior art in which the length of each destination and source field remains fixed in the course of time.

The field 1235, represented over 6 bits, identifies the peripheral 1069 among all the peripherals of the bus 1059. The field 1235 of the packet 1231 has been replaced by the field 1249 in the packet 1240. The value of the field 1249, allows the bridge 1067 to identify the peripheral 1069 among all the peripherals of the bus 1059.

The field 1234, represented over 6 bits, contains the information which will allow the destination bridge 1061 to identify the destination peripheral 1068 of the asynchronous packet among all the peripherals of the bus 1052.

It should be noted that the third field or marker has a length which is at least equal to the number of bits necessary to code a routing identifier of an item of interconnection equipment or portal.

As mentioned above, the marker includes a predetermined series of bits which may, for example, be a consecutive series of bits all having the same state 0 or 1.

Figure 8:
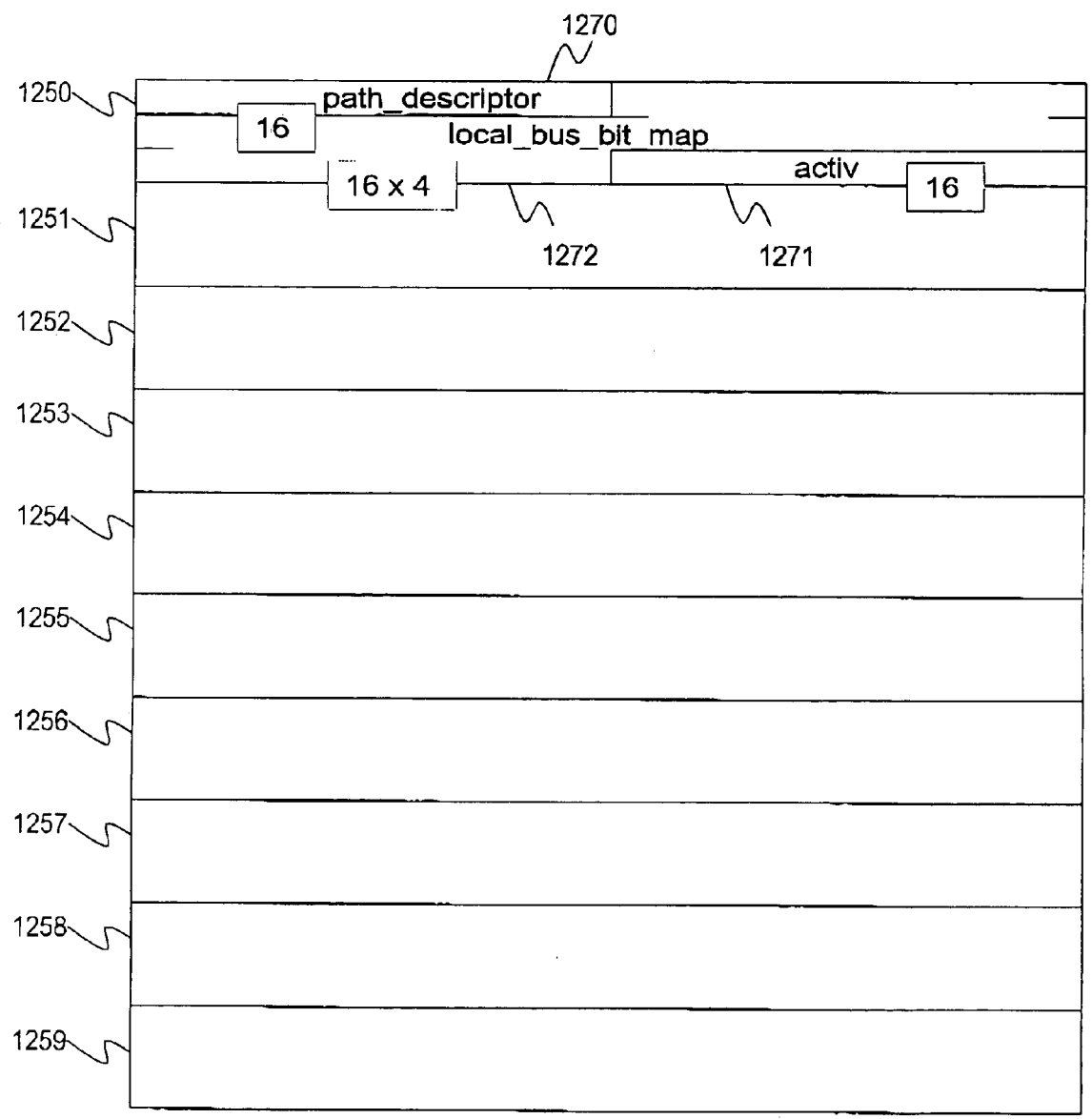
FIG. 8 is a detailed diagrammatic view representing a routing table stored in the RAM memory of the data processing apparatus of FIG. 3.
Figure 9:
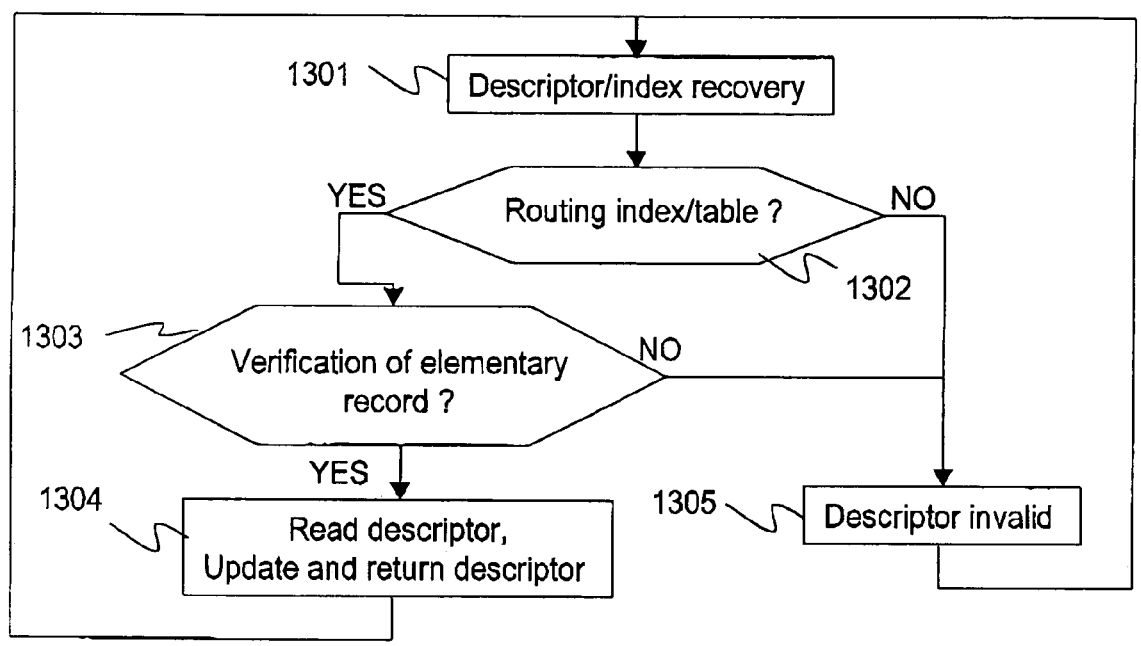
FIGS. 9 and 10 represent a diagrammatic view of the algorithms of the methods, on the one hand, of recovering a path descriptor from an index in the routing table and, on the other hand, for recovering an index on the basis of a path descriptor.
Figure 10:
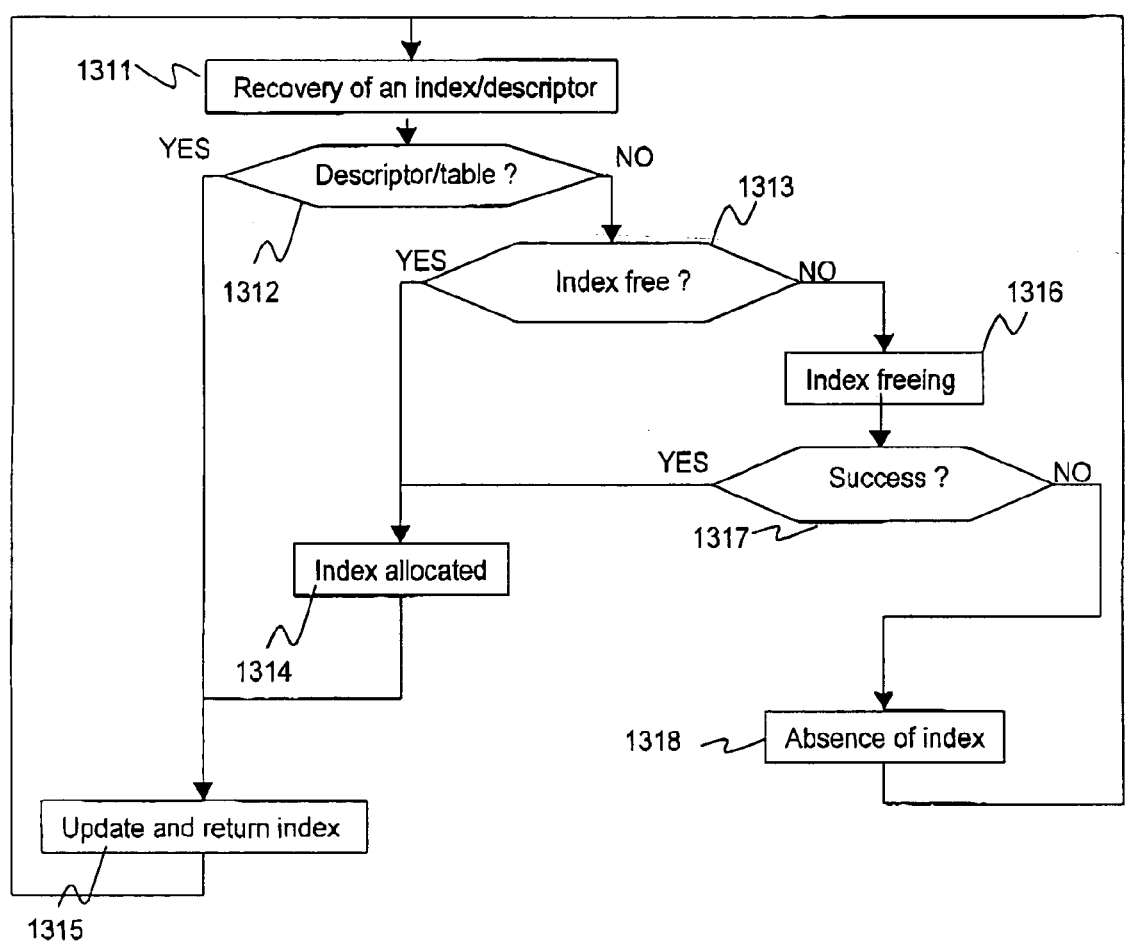

The use and the management of the offset field are described more particularly with reference to FIGS. 8, 9 and 10.

FIG. 8 is a detailed diagrammatic view of a routing table illustrated by each register 1095, 1096 of FIG. 4 and which is stored in the RAM memory of each item of interconnection equipment or portal of a source or destination bridge. This table is for the purpose of associating with an index (offset), unique on the local bus, a path making it possible to reach a distant peripheral, and vice versa.

This table consists of a set of elementary records 1250 to 1259, each elementary record being associated with an index in the table. The records 1250, 1251, 1252, 1253, 1254, 1255, 1256, 1257, 1258 and 1259 are associated respectively with the indices 0, 1, 2, 3, 4, 5, 6, 7, 8, 9.

The structure of an elementary record consists, for example, of the following fields.

The field 1270 "path_descriptor" corresponds to a path descriptor, represented over 16 bits, and contains the routing information making it possible to reach the distant destination peripheral.

The field 1271 "activ" (short for "activity"), represented over 16 bits, contains the information relating to management of the said path descriptor at local bus level.

This field is used particularly in order to know, at a given moment, how many transactions of "Request" type and awaiting a "Response" are in the course of processing.

This field may also be used so as to know for how long the elementary record has not been consulted.

In order to do this, a counter is incremented according to a period pre-defined by the interconnection equipment or portal and is reset to zero each time the "path descriptor" information or the index is used. This field thus makes it possible to optimise the management of the memory for the routing table.

It should be noted that the indices (offsets) of the elementary records, which are not being used and/or have not been used since a certain time, are preferably re-used first.

The field 1272 "local_bus_bit_map", represented over 64 bits, makes it possible to describe which are the peripherals on the local bus which are actually using this path descriptor. Each of the 64 bits, indexed from 0 to 63, corresponds to the peripheral the physical identifier of which has the value of the index in question.

As mentioned above, this field makes it possible to optimise the management of the memory for the table, by avoiding re-using an index which is used, even infrequently, by a large number of peripherals.

This field above all exhibits the advantage of being able to determine, in the case in which an index has been reallocated to another elementary record, whether the index is still up to date for a given peripheral on the local bus.

FIG. 8 describes, for example, a routing table possibly containing up to ten elementary records which are thus indexed from 0 to 9. Each elementary record contains three 32-bit words. With the maximum size of the elementary records reached, management thereof is necessary in order to release them before being able to add any.

It will be noted that the length of the fields 1270, 1271 and 1272 is indicative and can be reduced or increased depending on the capacities of the network.

Hence, for example, if a maximum of 32 peripherals per bus are allowed, this including the bridges, the length of the field 1272 "local_bus_bit_map" may be reduced to 32 bits and the total number of indices may be increased up to 15 for the same level of occupation of the memory.

This management may obey different policies such as, for example, that according to which the elementary records not being used and not having been used for a certain period are released.

Likewise, the number of peripherals which have used and which are still likely to use a given elementary record may advantageously be taken into account.

FIG. 9 is a diagrammatic view of the algorithm of a method of recovering a path descriptor from an index in the routing table described in FIG. 8.

This method is, for example, implemented by the bridge 1067 of FIG. 7 when the packet 1231 is transferred from the bus 1059 to the bus 1058.

These instructions or steps of such a method are stored in the ROM memory of the bridge in question.

In the course of the step 1301, the method makes provision for receiving a request for recovery of a path descriptor from a given index.

In the course of step 1302, it is verified that the index in question actually refers to an elementary record in the routing table. If so, processing carries on with step 1303. If not, the method makes provision for returning an item of information meaning that no path descriptor is valid for the said index (step 1305).

In the course of step 1303, the method includes a step of verification according to which the elementary record actually corresponds to the index presented by the peripheral at the origin of the request. This is because it may be that the elementary record corresponding to the said index has been deleted from the table, since this index value has been re-used to describe another elementary record for another peripheral.

In order to do this, a set of 64 bits (indexed from 0 to 63) is used to draw up a map of the peripherals using the elementary record in question.

Each bit makes it possible to know whether, for the peripheral the physical identifier of which has the index value from among the 64 bits, the elementary record is or is not valid.

In the event that the information is said to be invalid, the method makes provision for returning an item of information meaning that no path descriptor is valid for the said index (step 1305).

In the event that the information is valid, step 1303 is followed by step 1304.

In the course of step 1304, the method reads the path descriptor, updates the management information relating to the elementary record, and finally returns the path descriptor for the said index.

Among the management information relating to the elementary record, the following two actions may particularly be mentioned:

Firstly, when a request to recover a path descriptor from an index arises from a transaction of the "Request" type, a counter indicating the use of this elementary record is incremented if a transaction of "Response" type is expected. This counter will be decremented upon a subsequent request for recovery of an index from a path descriptor arising from a transaction of "Response" type.

Secondly, upon each use of the elementary record, the counter indicating the duration elapsed since the last use of this record is reset to zero.

This latter counter may, for example, be incremented upon a time-based event generated with a pre-defined period.

After returning the path descriptor or the absence of a path descriptor for the said index, the method makes provision to return to step 1303 in order to handle any further request to recover a path descriptor from an index in the routing table.

FIG. 10 is a diagrammatic view of the algorithm of a method of recovering an index from a path descriptor in the routing table described in FIG. 8.

This method is implemented, for example, in the bridge 1067 of FIG. 6 upon the transfer of the packet 1216 from bus 1058 to bus 1059.

The instructions or steps of such a method are stored in the ROM memory of the bridge in question.

In the course of a step 1311, the method makes provision for receiving a request to recover an index from a given path descriptor.

In the course of the following step 1312, the method makes provision for verifying that the path descriptor in question is present in the routing table.

If so, step 1312 is followed by step 1315, in the course of which, as appropriate, the management information relating to the elementary record is updated, and the index corresponding to the said path descriptor is returned.

As for the management information relating to the elementary record, mention may particularly be made of the following two actions:

Firstly, when a request to recover a path descriptor from an index arises from a transaction of the "Response" type, the counter indicating the use of this elementary record is decremented.

Secondly, the counter indicating the duration elapsed since the last use of this record is reset to zero.

This latter counter may, for example, be incremented upon a time-based event generated with a pre-defined period.

In the negative case, the method includes a step 1313 in the course of which it is checked whether at least one index (and thus an elementary record) is free in the routing table.

If so, in the course of a step 1314, an index is allotted and used to store the information path descriptor.

A bit among the set of 64 bits (indexed from 0 to 63) which corresponds to the physical identifier of the peripheral at the origin of the request is set so as to enable this elementary record for the peripheral in question.

If the index is not free, the method frees one or more indices (and thus elementary record(s)) in the routing table in the course of a step 1316.

The following step 1317 consists in verifying whether the freeing step has been carried out successfully. If so, step 1314, previously described, is carried out again. If not, in the course of a step 1318, the method makes provision for returning an item of information indicating the absence of an index (and thus of an elementary record) for the said path descriptor. Next, step 1311 is again performed.

Figure 11:
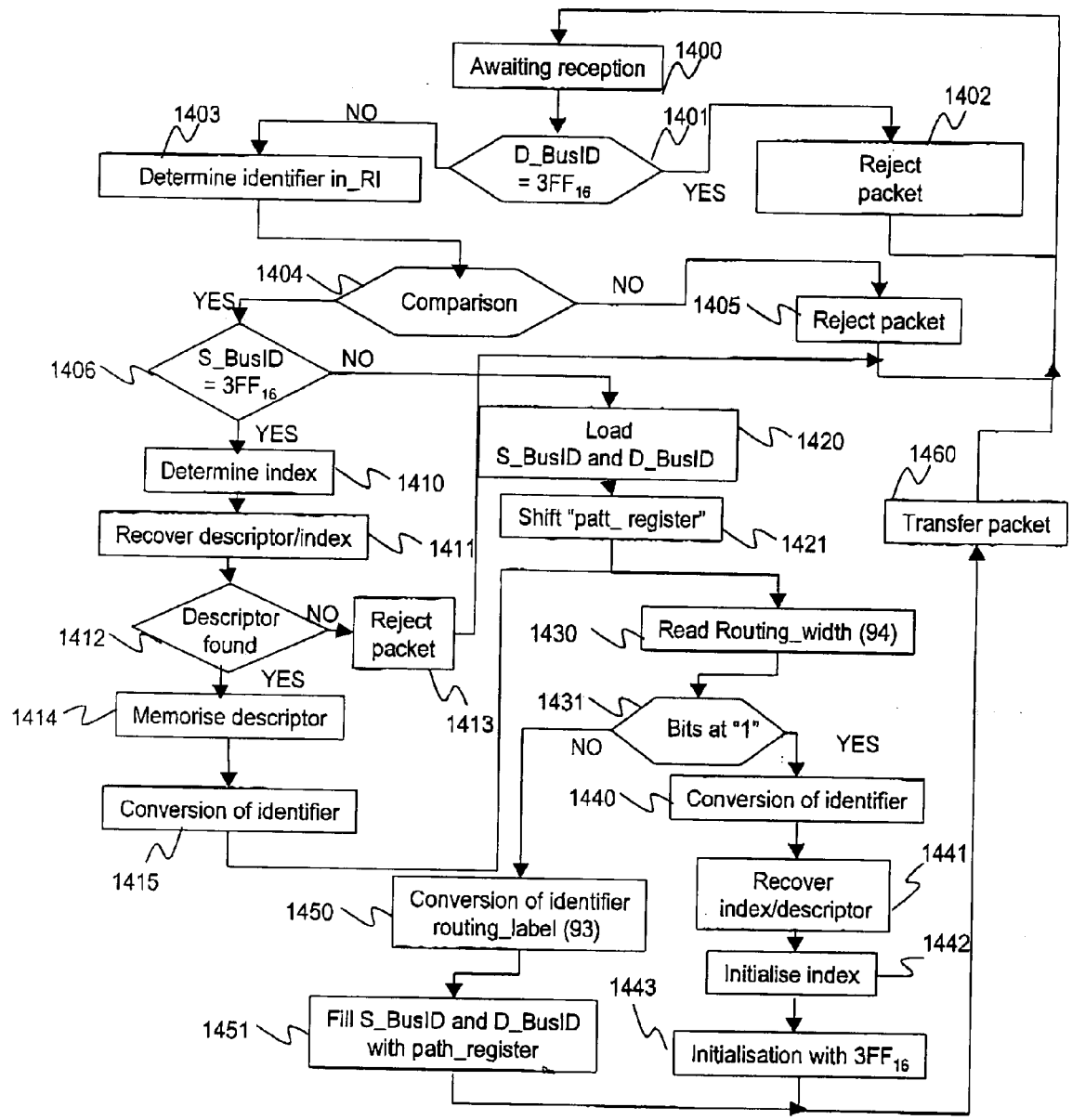
FIG. 11 is a diagrammatic view of the algorithm of a packet transfer method.

FIG. 11 represents an algorithm on which a method of routing asynchronous packets within a bridge is based.

The instructions or steps of such a method are stored in the ROM memory of each bridge.

This algorithm relates to the taking of routing decisions for the said packets as well as the conversion of their headers, on the basis of the result of the analysis of the contents of the headers of the packets received.

In the rest of the description, temporary variables stored in the RAM memory of the bridge in question (D_busID, S_busID, in_RI, out_RI, path_register) have been introduced in order to facilitate the understanding of the algorithm on which the method is based.

The method starts with a step denoted 1400 in FIG. 11 consisting in awaiting the reception of an asynchronous packet. When such a packet has been received and stored in memory, step 1401 is entered for analysing the identifier of the destination_bus D_busID included in the header of the said packet.

In the rest of the description, D_busID represents the information from the "destination_Bus_ID" field of FIG. 2, and likewise S_busID represents the information from the "source_Bus_ID" field of this same Figure.

If the said identifier is equal to $3FF_{16}$, it then relates either to a packet sent out on the local bus and intended for this local bus, or a distant packet which has arrived on its destination bus (as described in FIG. 6). In this case of equality, step 1401 is followed by step 1402 consisting, since this packet is intended for the said local bus, in rejecting the packet without any other processing. step 1402 is followed by step 1400 of awaiting a further asynchronous packet.

When, in the course of step 1401, an identifier of the destination bus other than $3FF_{16}$ is found, this means that the packet is within an intermediate bridge and steps 1403 and 1404 are then carried out.

It should be noted that, in the rest of the description, according to the Figure in question, the routing information or identifier (or label) of the destination path descriptor, is read in the low-order bits of the field D_busID, the routing identifier or information (or label) of the path descriptor travelled is written into the low-order bits of the field S_busID, the bits being shifted from one field to another in an appropriate way.

For example, right-shifting of the field D_busID and left-shifting of the field S_busID are carried out, each bit arising from the left-shifting of the high-order bit of the field S_busID being inserted, after a right-shifting of the bits of the field D_busID, in place of the high-order bit of the field D_busID.

Other variants consisting in combining reading/writing of the routing information of the path descriptors onto the high/low-order bits of the fields D_busID and S_busID with the appropriate shiftings are not described in the present description but can be envisaged by a person skilled in the art.

Returning to the algorithm of FIG. 11, step 1403 consists in determining the routing label or identifier of the destination path descriptor in_RI.

To do this, the routing label or identifier is extracted from the field D_busID of a length or size (in bits) equal to the content of the "routing_width_30" register 1092 (FIG. 4) associated with the interconnection equipment or inbound portal.

In the example of FIG. 5, the field D_busID is equal to $1111\ 011\ 001_2$, the value routing_width_30 is equal to 3 and the routing label or identifier in_RI is equal to $001_2$.

Once the value of the routing label or identifier in_RI of the packet is known, step 1404 makes it possible to compare it with the content of the register "routing_label_30" 1091 which constitutes the unique routing label or identifier allocated in the case of the bus in question to the interconnection equipment or portal on which the packet in question has been received.

If the two values are different, then step 1400 is carried out. This step consists in rejecting the packet then passing to step 1405 described above.

In the opposite case, that is to say when the values in_RI and "routing_label_30" are equal, step 1404 is followed by test 1406 so as to analyse the identifier of the source bus S_busID included in the header of the packet processed.

If the identifier is equal to $3FF_{16}$, this means that the packet is situated at a source bridge, then the packet is said to be distant (destination on a distant bus) and is received from its source bus (such as, for example, the packet referenced 1231 in FIG. 7). The header of this packet will then be processed according to steps 1410, 1411, 1412, 1413 or 1414 and 1415 described in more detail below.

In the opposite case, the distant packet processed transits on an intermediate bus between its source bus and its destination bus (such as, for example, the packet referenced 1216 in FIG. 5). The processing of the header of the packet then follows steps 1420 and 1421 also described below.

During step 1410, a routing index (offset) is extracted from the field D_busID of the packet (previously defined during the description of FIGS. 6 and 7), taking account of the routing_width_30 value mentioned above during explanation of step 1403. This index (offset) consists of the (10-routing_width_30) high-order bits of the field D_busID, 10 being the width of the said field D_busID.

For example, in the case in which the field D_busID is equal to $0001101\ 000_2$ and the value routing_width_30 is equal to 3, the index will be equal to $0001101_2$.

Next, during step 1411, the index (offset) is converted into a path descriptor according to the method of recovering a path descriptor from an index in the routing table as described above (FIG. 9, steps 1301 to 1305).

A test 1412 then consists in verifying whether such a path descriptor has been found in the course of carrying out the method.

If not, step 1413 is carried out, consisting in rejecting the packet processed.

In variant embodiments of this method, more sophisticated error handling methods (not reproduced in detail in the Figures) may be envisaged in the course of step 1413.

Such methods consist, for example, in sending a negative acknowledgement to the peripheral which originated the packet for which the path descriptor is obsolete, allowing it to adjust its routing table without waiting for a certain timeout to expire.

Step 1413 is followed by step 1400 of awaiting a new packet to be processed already described above.

In the positive case of test 1412, the path descriptor, returned by step 1411, is stored in the register path_register in the course of step 1414. The register path_register is used for managing the path descriptors (destination path and travelled path) and advantageously consists of two sub-fields, each of these sub-fields corresponding to the information contained respectively in the fields D_busID and S_busID.

Next, in the course of step 1415, the method carries out the replacement, on the register path_register, of the physical identifier of the peripheral present in the field of the source address 1235 of the packet of FIG. 7 by the corresponding virtual identifier, this by using an appropriate correspondence table established during each reinitialisation (bus reset) of the source bus 1052 of FIG. 1. This table establishing the correspondence between the virtual and physical identifiers of various items of equipment (peripherals, bridges, etc.) connected to a bus is well known to the person skilled in the art and is moreover illustrated in FIG. 21.

Step 1415 is then followed by a step 1430 the description of which is given later.

Back at step 1406, if the identifier is different from $3FF_{16}$, then this step is followed by a step 1420 of processing of a packet received from an intermediate bus.

Step 1420 consists in loading (memory storage) the register path_register on the basis of the bus identifiers D_busID and S_busID extracted respectively from the "source_Bus_ID" 1081 and "destination_ID" 1080 fields of the header (FIG. 2) of the packet processed.

It is reiterated here that each of the two identifiers of the bus consists of the 10 high-order bits of the corresponding address field (1080 or 1081), while the 6 remaining bits of the said address fields represent the identifier (either physical or virtual) of the peripheral addressed on the bus in question.

The loading operation takes account of the method of managing the fields D_busID and S_busID mentioned above such as, for example, right-shifting of the field D_busID and left-shifting of the field S_busID, and where each bit originating from the left-shifting of the high-order bit of the field S_busID is inserted, after right-shifting of the bits of the field D_busID in place of the high-order bit of the field D_busID.

Next, in the course of step 1421, the content of the register path_register is converted in the way shown below (for a better understanding of this step, the reader is asked to refer to FIG. 5).

Firstly, a sequence of maximum length comprising at least (2 max_width-1) consecutive bits at "1" ("max_width" being the value of the register 1097 of FIG. 4) is identified, constituting a marker or separator between the field identifying the destination path and the field identifying the path travelled. In the example of the packet 1199 illustrated in FIG. 5, the sequence includes 5 bits at "1", the sequence "011 001$_2$" describes the destination path, and the sequence "011 010011$_2$" describes the path travelled.

It should be noted here that, in separating the three fields mentioned in the previously described way, it is possible (erroneously) to allocate to the marker possible adjacent bits belonging to the field of the path travelled and/or to the field of the destination path in the event that the said bits are equal to "1". This does not, however, constitute a problem for the correct functioning of the algorithm described.

A shift is subsequently carried out in the register path_register, according to the management mode adopted, of the bits of the destination path descriptor field (identifier of the path to be travelled) by a number of bits which is equal to the routing_width_30 value.

The non-significant bits, following the shifting, are set to "1" and the bits of the marker are not altered. The register "routing_width_30" 1092 indicates the length in bits of the routing label or identifier on the entry bus of the packet processed.

Hence, in the example of FIG. 5, the bits of the field 1202 have disappeared, the bits of field 1201 have been shifted by a number of bits equal to the routing_width_30 value (to the right in the field "destination_bus_ID" 1080*a* of FIG. 2) and now occupy the field referenced 1211, the bits which have become non-significant in the field referenced 1201 are set to "1", the bits of the marker, referenced by the fields 1200 and 1205 remaining unchanged.

It should be noted that the size or length in bits of the marker is thus increased by a number equal to the routing_width_30 value.

A shift is then carried out in the register path_register, according to the management mode adopted, of the bits of the marker of the path travelled (identifier of the path travelled) by a number of bits which is equal to the value routing_width_32, a number of bits equal to the value routing_width_32 of the bits of the marker then being written.

It should be remembered here that the register "routing_width_32" 1094 associated with the interconnection equipment or outbound portal in fact indicates the length in bits of the routing label or identifier on the outbound bus of the packet processed.

The value of the bits describing the routing label or identifier for the descriptor of the path travelled (identifier of the path travelled) will be determined during step 1450 carried out subsequently.

In the example of FIG. 5, the information bits of the fields 1206, 1207 and 1208, describing the path travelled, have been shifted by a number of bits equal to the value routing_width_32 (to the left in the field "source_bus_ID" 1081*a* of FIG. 2, then to the right in the field "destination_bus_ID" 1080*a* of FIG. 2) and then occupy the fields 1209 and 1212 respectively in the first case, 1213 in the second case and 1214 in the third case. The fields 1209 and 1212 formerly forming part of the marker from now on contain information describing the path travelled. The field 1215 will be allocated during the operation described in step 1450.

During the various phases mentioned above, and which take place in the course of step 1421, the marker is also shifted with respect to its previous position within the register path_register.

If the value routing_width_32 is higher than the routing_width_30 value, then the length of the marker is reduced by the difference.

Similarly, if the value routing_width_32 is less than the routing_width_30 value, then the length of the marker is increased by the difference.

It should be noted that, by this rule, the length of the marker remains greater than or equal to the value 4*max_width-1-routing_width_30-routing_width_32 (which is always greater than or equal to 2*max_width-1) in each bridge crossed on condition that this condition is fulfilled initially.

This guarantees that the marker remains identifiable by each bridge. In the example of FIG. 5, the marker or field separator previously consisting of the fields 1200 and 1205 is, after passing the bridge 1066, represented by the field 1210, its length having remained at 5 bits.

In the present description, the size or length of the routing labels or identifiers is fixed throughout the network although this is not imperative. This means that the registers "routing_width_30" 1092, "routing_width_32" 1094 and "max_width" 1097 contain the same value in each bridge of the network. It will be noted that, in order to do this, it is sufficient for the marker to include at least a number of bits equal to the value "max_width" (instead of 2*max_width-1 bits under the assumption of variable length of the routing labels or identifiers).

In a variant embodiment, the registers "routing_width_30" 1092, "routing_width_32" 1094 may include different values for the same bridge of the network.

It will be noted that the preceding description given by reference to FIG. 1 applies to this variant.

Step 1421 is followed by steps 1430 of reading the field consisting of the (routing_width_32) bits of the first field (equivalent to D_busID) of the register path_register and by the test 1431 so as to determine whether all the bits read are equal to "1", that is to say if the packet has reached its destination bus. If yes, steps 1440, 1441, 1442 and 1443 are carried out, otherwise steps 1450 and 1451 are entered.

For a better understanding of the description of steps 1440 to 1443 of the processing of a packet arriving on its destination bus 1059, the reader is requested to refer to FIG. 6.

During step 1440, the field 1203 of the header of the asynchronous packet constituting the virtual identifier of the peripheral or destination equipment 1069 of the said packet on the bus 1059 is replaced by the physical identifier 1221 which corresponds to it, by using the appropriate correspondence table.

The step 1441 consists in converting the identifier of the path travelled contained in the register path_register into an index 1223 (offset) as described above with reference to steps 1311 to 1318 of FIG. 10.

During step 1442, the field of the header identifying the path travelled is initialised with the concatenation of the said index 1223 (offset) and of the content 1224 of the register "routing_label_32" 1093 (FIG. 4), taking account of the number of valid bits of the routing label or identifier, indicated by the register "routing_width_32" 1094.

Next, in the course of step 1443, the field of the header 1220 identifying the destination bus is initialised with the value $3FF_{16}$. This processing is followed by step 1460.

In the course of step 1450 (when the bits read are not all equal to "1"), the bits identifying the path travelled of the register path_register (number indicated by the value routing_width_32) are initialised with the routing label or identifier 1093 stored in the register "routing_label_32" associated with the interconnection equipment or portal situated on the outbound bus of the packet processed.

During step 1451, the fields identifying the source bus, that is to say fields 1212, 1213, 1214, 1215, 1209 and the destination bus, that is to say fields 1210 and 1211 are initialised respectively with the content of the register path_register. This processing is also followed by the step 1460.

Step 1460 consists in transferring the packet onto the bus 1058 (FIG. 7) and 1059 (FIG. 6) respectively. This step is followed by step 1400 of awaiting a further packet to be processed.

It is to noted that the different fields denoted 1200 to 1215 (FIGS. 5 and 6), 1220, 1221, 1223, 1224 (FIG. 6), 1232 to 1236 (FIG. 7), 1241 to 1244 and 1246 to 1249 can also be called sub-fields.

The following description of FIGS. 12 to 14 rests on the mechanisms described with reference to FIGS. 1 to 11.

Figure 12:
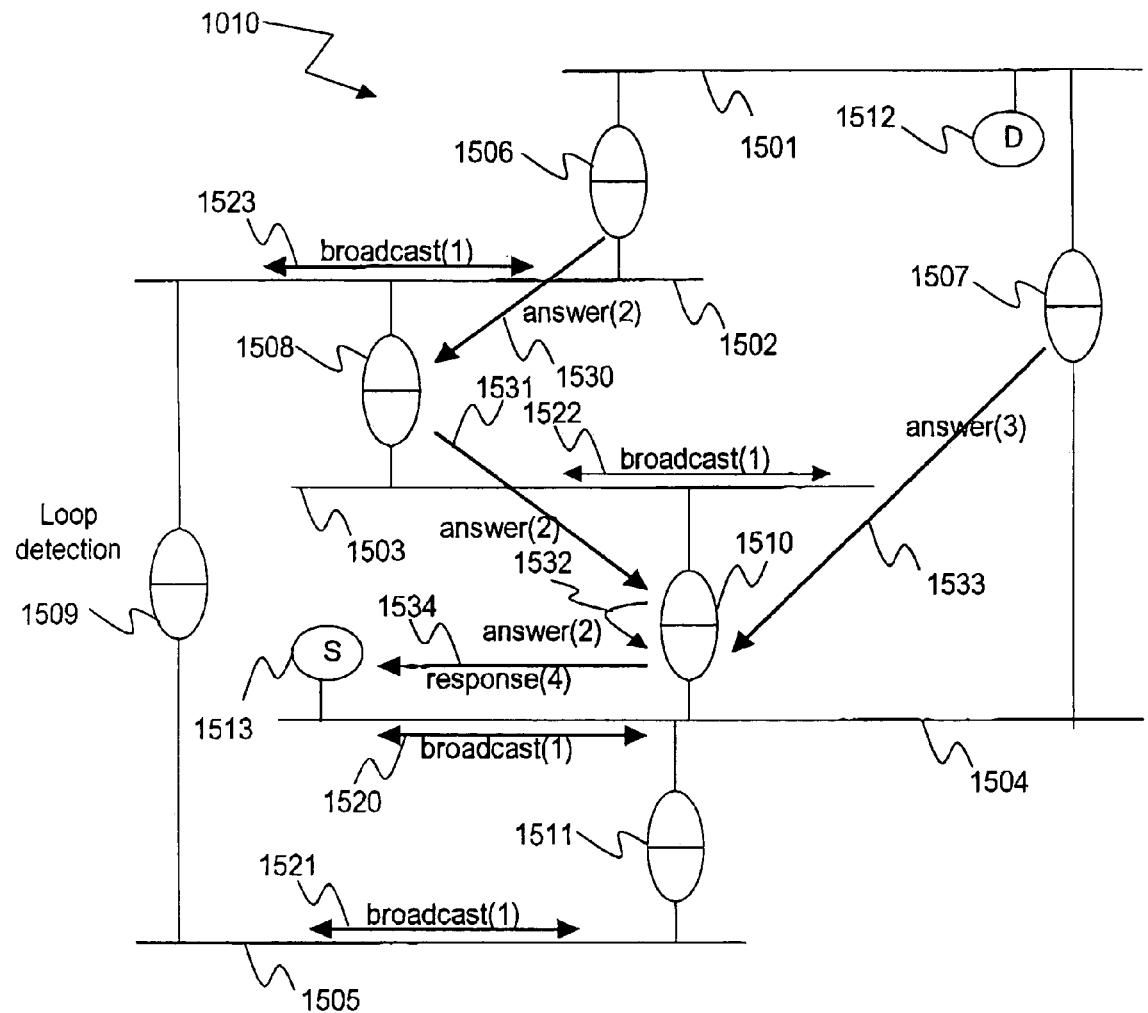
FIG. 12 is a diagrammatic view of a bus network during the broadcasting of an address resolution packet on the one hand, and of its corresponding response packet on the other hand.

FIG. 12 is a diagrammatic view of a bus network during the broadcasting of an address resolution packet on the one hand, and of its corresponding response packet on the other hand.

This network consists of the buses 1501 to 1505 interconnected by the bridges 1506 to 1511.

The address resolution packet is sent by an item of source equipment 1513 connected to the bus 1504 known as first bus within the meaning of the invention, so as to obtain a path descriptor making it possible subsequently to gain access to the distant equipment by means of asynchronous packets as described in the 1394-95 standard. This address resolution packet is broadcast throughout the bus network.

A complementary mechanism may be employed within each item of interconnection equipment or portal of a bridge in order to avoid the packet being transmitted more than once on the same bus and thus to avoid any infinite looping in the bus network. This mechanism, known to the person skilled in the art and described, for example, in the book "DATA NETWORKS", second edition, by Bertsekas Gallager, Prentice Hall International Editions, ISBN 0-13-201674-5" in the chapter entitled "Flooding and broadcasting", is based, for example, on the following principles: the packet being broadcast is identified uniquely (for example using a unique identification number which is the EUI-64 number of the source equipment and a sequence number identifying this packet uniquely in this same source equipment), when an item of interconnection equipment or portal broadcasts this packet, it memorises certain items of information which will allow it subsequently to know whether a broadcast packet which it has received should or should not be broadcast on the other item of interconnection equipment or portal of the bridge in question, on each of the other items of interconnection equipment or portals of the said bridge if appropriate, particularly on the basis of a previous reception of this same packet.

Figure 15:
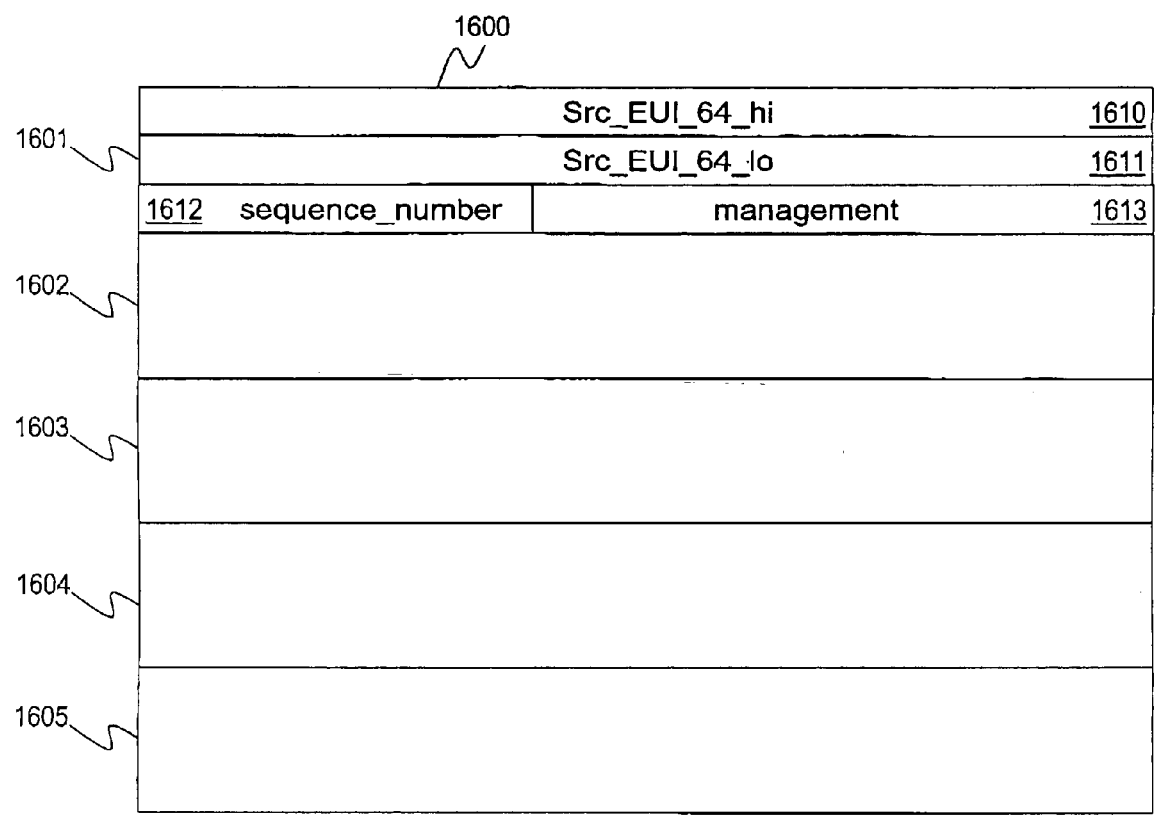
FIG. 15 is a detailed diagrammatic view representing a verification table stored in the RAM memory of FIG. 3.

The items of interconnection equipment or portals should, among other things to this purpose, manage a verification table called "broadcast" table such as that described, for example, in FIG. 15.

In the event that this packet is to be broadcast on a bus, the interconnection equipment or portal in question updates the path descriptor which will make it possible to route the response packet directly to the equipment which is at the origin of the address resolution packet. The broadcasting of this address resolution packet is indicated in FIG. 12 by the arrows 1520, 1521, 1522 and 1523.

When all the items of interconnection equipment or portals of the same bridge are grouped together into one and the same device such as that represented in FIG. 3, a single, common verification table known as "broadcast" table may be used for all the items of interconnecting equipment or portals of a given bridge.

On a given bus, each item of interconnection equipment or portal, internally having a table of the EUI-64 numbers of the various items of equipment connected to the bus, is tasked with verifying, upon reception of an address resolution packet, whether the equipment sought is or is not present on the bus.

If yes, the interconnection equipment or portal of the bridge 1506, for example that connected to the bus 1501, terminates the broadcasting of the address resolution packet and sends out an asynchronous response data packet 1530 to the bridge 1508 which transfers this response in the form of a packet 1531 to the bridge 1510, intended for the equipment which is at the origin of the address resolution packet.

To do this, the interconnection equipment or portal recovers the path descriptor updated during the broadcasting in the address resolution packet.

The asynchronous response data packet en route to the equipment 1513 at the origin of the address resolution packet will construct the path descriptor sought. The same goes for the interconnection equipment or portal of the bridge 1507 which will send out an asynchronous response data packet 1533 to the bridge 1510 (FIG. 12).

It is up to each item of interconnection equipment or portal of the bridges of the bus 1504, where the equipment 1513 at the origin of the address resolution packet is located, to recognise the various asynchronous response data packets, to filter them and to send only a single one of them, referenced 1534 in FIG. 12, to the equipment 1513, in the event that it has not already come from another item of interconnection equipment or portal connected to the bus 1504.

To do this, the interconnection equipment or portal should remember the fact that the address resolution request was followed by a response, for example by saving from the first response received, over a certain duration, data such as the EUI-64 number of the equipment sought and the sequence number identifying the address resolution packet in a unique way in this source equipment, and by comparing them with those actually received in the other response packets. Any asynchronous response data packets proving to be duplicates are simply ignored.

Figure 13:
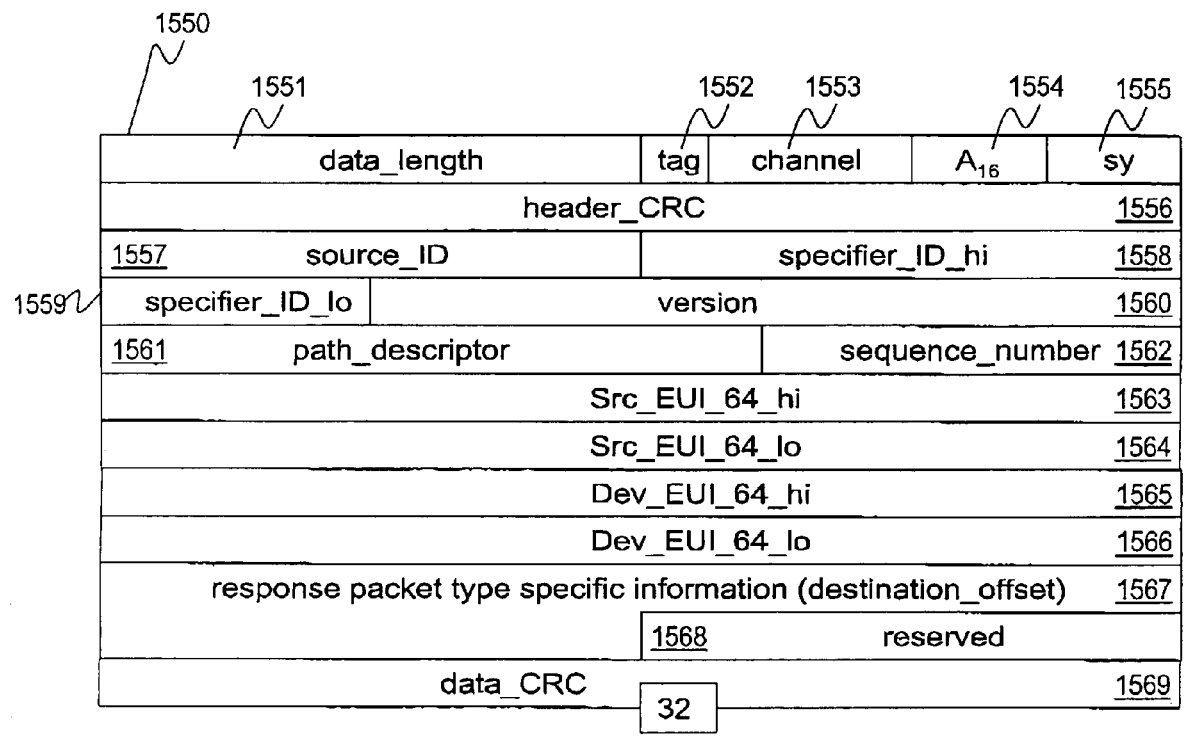
FIG. 13 is a diagrammatic view representing the structure of an address resolution data packet.

FIG. 13 is a diagrammatic view representing the structure of an address resolution data packet 1550. This packet format is preferably based on the format of a Global Asynchronous Stream Packet, or GASP for short.

The fields 1551 to 1556 called "data_length", "tag", "channel", "$A_{16}$", "sy" and "header_CRC" have constant values defined by the 1394 standardisation committee.

The value of the field 1557 "source_ID" makes it possible to specify the address of the interconnection equipment or portal sending the packet.

The fields 1558 to 1560, called "specifier_ID_hi", "specifier_ID_lo", and "version" have constant values defined by the 1394 standardisation committee.

The fields 1561 to 1568 constitute a part called data field of a GASP packet and are used in the manner indicated below.

The path descriptor field 1561 (path_descriptor), represented over 20 bits, contains the routing information derived upon routing the address resolution packet to the destination equipment sought. This field, known as second type field within the meaning of the invention, comprises information which is representative of the path travelled by the packet from the source bridge up to the current bridge where said packet is analyzed. The usable size of this field is defined on the basis of the value of the field's "max_width" 1097, "routing_width_30" 1092, and "routing_width_32" 1094 (FIG. 4) and of the processing carried out on the path travelled as explained during the description of step 1421 of FIG. 11.

For example, when an address resolution packet present on the bus 1056 of FIG. 1 is capable of being transferred by the bridge 1066 onto the bus 1058 and when the field 1561 includes, for example, the fields 1200 and 1205 to 1208 of FIG. 5, then the content of the field 1561 will be replaced by the fields 1210, 1209 and 1212 to 1215 upon transfer via the bridge 1066.

The field called sequence number field (sequence number) and denoted 1562, represented over 12 bits, makes it possible to identify this packet uniquely in the source equipment at the origin of the address resolution request.

The fields called "Src_EUI_64_hi" and "Src_EUI_64_lo" (high and low source EUI-64) and denoted 1563 and 1564 respectively, each represented over 32 bits, describe the EUI-64 number of the equipment at the origin of this address resolution packet. This EUI-64 number is useful for identifying the source equipment at the origin of the address resolution request uniquely.

The fields called "Dev_EUI_64_hi" and "Dev_EUI_64_lo" (high and low EUI-64 equipment sought) and denoted 1565 and 1566 respectively, each represented over 32 bits, describe the EUI-64 number of the equipment sought by the equipment at the origin of this address resolution packet. This EUI-64 number uniquely identifies the equipment sought.

These fields each represent a field of a first type identifying at least one peripheral for which the packet is intended for within the meaning of the invention.

When an item of equipment wishes to communicate with distant equipment, the latter sets, among other things, the fields 1563 and 1564 ("Src_EUI_64_hi" and "Src_EUI_64_lo") with its EUI-64 number, and the sequence number field 1562 with a value which is unique for this equipment (value incremented, for example, after each sending of such a packet).

By saving this sequence number for each item of equipment sending an address resolution packet, over a predetermined duration for example equal to one second, each item of interconnection equipment or portal of the network can thus avoid sending this packet again onto the adjacent bus(es).

The field called "response packet type specific information" ("specific information for the response packet") and denoted 1567, represented over 48 bits, contains the information necessary for constructing the response packet in response to the address resolution packet. This information is set by the equipment sending the address resolution packet. This field, in the case in which the response packet is based, for example, on an asynchronous primary packet of the write type (described in the standard 1394-95) particularly specifies the destination address in the source equipment which is at the origin of the address resolution packet, to which address the destination equipment sought could write data in response to the request. The response packet is, for example, a packet of the write request for data block type.

A field called reserved field and denoted 1568, represented over 16 bits, as its name indicates, is not used for the moment.

The value of a field called "data_CRC" and denoted 1569 is calculated as a function of the value of the fields 1557 to 1568 according to the rules determined in advance by the 1394 standardisation committee.

Figure 14:
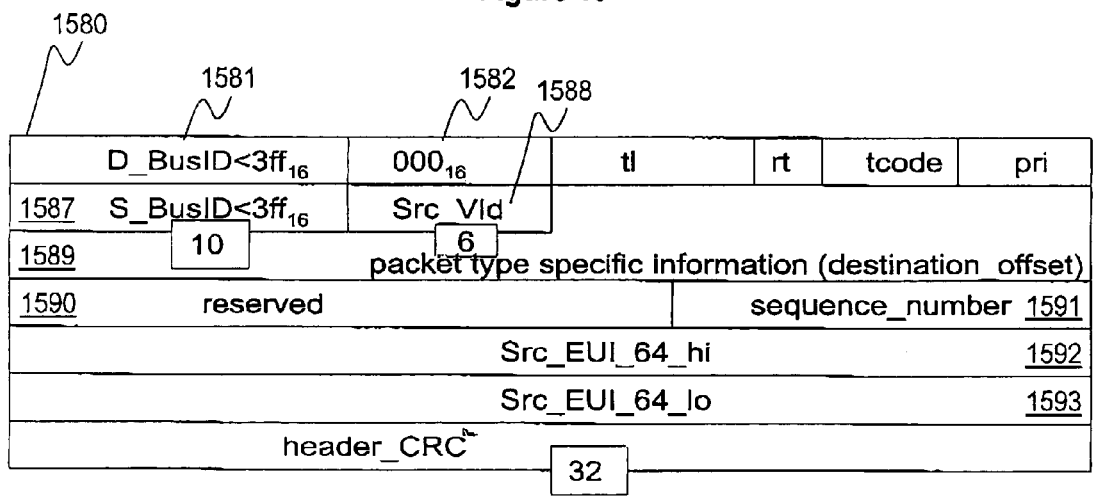
FIG. 14 is a diagrammatic view representing the structure of an asynchronous data packet for response to the packet described in FIG. 13.

FIG. 14 is a diagrammatic view representing the structure of an asynchronous data packet, 1580, for response to the address resolution packet, 1550, described above. This format of such a packet is extensively described in the standard 1394-95, and is illustrated in FIG. 2. Only the fields which are of use in the context of the present document are described below.

As mentioned above, the value of a field called "tCode" and denoted 1585 may, for example, correspond to a request of the type "write request for data block".

A field called reserved field and denoted 1590, represented over 16 bits, as its name indicates, is not used for the moment.

A field called "sequence_number" field and denoted 1591, represented over 12 bits, makes it possible to identify the packet uniquely in the equipment which is at the origin of the address resolution request.

The fields called "Src_EUI_64_hi" and "Src_EUI_64_lo" (high and low source EUI-64) and denoted 1592 and 1593 respectively, each represented over 32 bits, describe the EUI-64 number of the equipment at the origin of the address resolution packet. This EUI-64 number is useful for uniquely identifying the equipment which is at the origin of the address resolution request.

The fields 1592, 1593 ("Src_EUI_64_hi" and "Src_EUI_64_lo") and the field 1591 ("sequence_number") particularly allow each item of interconnection equipment or portal on the bus known as "source" bus (the bus where the equipment which is at the origin of the address resolution request is located) to know whether a response has already been sent to the equipment which is at the origin of the address resolution request.

The items of interconnection equipment or portals on the "source" bus, to that end, have to manage a verification table called a "response" verification table as described, for example, in FIG. 15.

It will be noted that the detection and the processing of looping relates to an improvement applied to the method of routing an address resolution packet and which uses methods described in the state of the art.

This is because a default processing of the looping is implemented by the method of routing an address resolution packet during the processing associated with the field 1561: when the whole of the usable area of the field 1561 of the broadcast address resolution packet is used to describe the path travelled, the method of transferring the packet from one bus to the other is stopped.

Hence the packet transfer method, by insertion of routing labels or identifiers, upon each loop, will use up a part of the usable area of the field 1561 of the address resolution packet, until the whole of the field is filled, which has the effect of stopping the transfer of the packet.

FIG. 15 is a detailed diagrammatic view representing a verification table 1600 stored in the RAM memory of FIG. 3. This type of table may be used by the two types of verification described above:

broadcasting of an address resolution packet on the one hand, generation of one and only one response packet corresponding to an address resolution packet on the bus where the equipment which is at the origin of this address resolution packet is located.

FIG. 15 illustrates, for example, a verification table containing a limited number of elementary records denoted 1601 to 1605.

The fields called "Src_EUI_64_hi" and "Src_EUI_64_lo" (high and low source EUI-64) and denoted 1610 and 1611 respectively, each represented over 32 bits, describe the EUI-64 number of the equipment which is at the origin of the address resolution packet. This EUI-64 number is useful for uniquely identifying the equipment which is at the origin of the address resolution packet.

A field called "sequence_number" field (sequence number) and denoted 1612, represented over 12 bits, makes it possible to identify this packet uniquely in the equipment at the origin of the address resolution packet.

A field called management field and denoted 1613, represented over 20 bits, makes it possible to associate information with each record of the table depending on the type of table envisaged.

In the case of a verification table called a "broadcast" verification table (used to manage the broadcasting of an address resolution packet in such a way that this packet is transmitted on each bus of the network, once and only once), the management field may, for example, contain information indicating whether an address resolution packet has already either been received by the interconnection equipment or portal, or transmitted by this equipment or portal (a Boolean value may be sufficient, for example).

In the case of a verification table called a "response" table (used to manage non-duplication of a response to equipment which is at the origin of an address resolution packet), the management field may, for example, contain information indicating whether a response packet has already either been received by the interconnection equipment or portal, or transmitted by this equipment or portal (a Boolean value may be sufficient, for example).

According to a first variant not represented here, a counter could contribute supplementary information on the fact that several responses, that is to say several path descriptors exist, and that therefore a choice could be made on the path descriptor to be adopted according to pre-defined criteria such as the shortest path for example.

This variant then stipulates a communications protocol to be defined between the various items of interconnection equipment or portals so as to implement the change of path descriptor to be used.

In a second variant not described here, it is the alpha portal which collates all the responses received within the local bus where the equipment which is at the origin of the address resolution packet is located and which decides, according to pre-defined criteria such as the shortest path for example, to retain one path descriptor, and which finally sends only a single response packet to the equipment which is at the origin of the address resolution packet.

A third variant consists in using, as information in the management field, in addition to the indicator of the passage of an address resolution packet or of a response packet already transmitted, a value indicating, for example, the duration in terms of units of time correctly defined (timeout) beyond which this record has no further meaning and can therefore be destroyed.

A fourth variant consists in using only a single verification table both for the "broadcast" and the "responses". In this case, the management field can be broken down between two fields, one containing information relating to the address resolution packet broadcast, the other to the packets in response to this address resolution packet.

FIG. 16 is a diagrammatic view of the algorithm of an address resolution packet reception method within an item of interconnection equipment or portal of a bridge connected to a second communication bus within the meaning of the invention.

The instructions or steps of the method are stored in the ROM memory of each bridge of the network.

Within the source bus also known as first bus, the address resolution packet sent out by the source equipment is described by reference to FIG. 13.

This packet should be held by the source items of interconnection equipment or portals which will translate it into an address resolution packet as represented in FIG. 13.

In the course of a step 1701, an address resolution packet is received within an item of interconnection equipment or portal. In the course of step 1702, the source EUI-64 and sequence number fields described above with reference to FIG. 13 are read.

In the course of step 1703, the process makes provision for verifying whether an elementary record, having the source EUI-64 number which has just been read in the received packet, already exists in the verification table 1600, represented in FIG. 15, from high and low source EUI-64 fields present in this table.

In the case where the record does not exist, in the course of step 1704, the process makes provision for creating one of them with the values of the source EUI-64 and sequence_number fields read in the packet received, for example the record 1601 represented in FIG. 15, then carries on with step 1709.

In the event that the record already exists in the verification table, in the course of step 1705, the process makes provision for verifying that the sequence number read from the packet received is strictly higher than the current sequence number of the record, denoted 1612 for example in FIG. 15.

If not (smaller or equal), during step 1706 the address resolution packet is ignored; it may be, for example, that it is an older packet which in any event is no longer valid.

If yes, the process updates the sequence number of the record with that read from the packet received, in the course of step 1707, as well as management information (such as that mentioned above, such as, for example, a Boolean value indicating whether an address resolution packet has already transited on the bus seen by the interconnection equipment or portal, and/or a counter indicating how many identical address resolution packets have been detected on the bus seen by the interconnection equipment or portal, and/or a value indicating, for example, the duration in units of time correctly defined (timeout), beyond which this record has no further meaning and can therefore be destroyed), in the course of step 1708.

In the course of the step 1709, the process makes provision for verifying whether the interconnection equipment or portal knows of the equipment sought, identified by the "Dev_EUI_64_hi" and "Dev_EUI_64_lo" fields known as fields of first type, denoted 1565 and 1566 respectively in FIG. 13.

Put another way, in the case in which the equipment sought is located on the same bus known as second bus within the meaning of the invention (this bus is also called "destination bus") as the interconnection equipment or portal in question, then the latter has its EUI-64 number in an internal table which is not described in this context since it is defined in the context of the pending specifications of the 1394 bridge standard.

More precisely, step 1709 consists in comparing the fields of the first type 1565 and 1566 with a predetermined value known as end-of-transfer value.

This end-of-transfer value is the EUI-64 number of the corresponding interconnection equipment or portal.

If yes, in the course of step 1710, the process makes provision for carrying out the operations of creating and/or updating in the routing table described above with reference to FIGS. 8 and 9, then initiating the sending of a response packet 1580, as described with reference to FIG. 14, to the said address resolution packet.

The fields of this response packet 1580 are set, in particular, by using the values of the fields of the address resolution packet as follows:

the path descriptor field 1561 is used to set the fields 1581, 1582, 1587 and 1588, the field "response_packet_type_specific_information" 1567 is used to set the field of the same name 1589, the "sequence_number" field 1562 is used to set the field of the same name 1591, the "Src_EUI_64_hi" and "Src_EUI_64_lo" fields denoted 1563 and 1564 respectively are used to set the fields of the same names 1592 and 1593.

It is to be noted that in accordance with the description which has been made with reference to FIGS. 5 to 7, during the transfer of the packet in the network, information identifying the path to be travelled by the packet have been consumed in the path descriptor path identifier) and information identifying the path travelled by the packet have been added so as to elaborate the path thus travelled by said packet.

Thus, the path descriptor field 1561 now comprises the path travelled by the address resolution packet and which will constitute the path to be travelled by the response packet 1580 from the destination bridge to the source bridge.

If no, in the course of step 1711, the process makes provision for verifying whether the interconnection equipment or portal has received the address resolution packet from the bus on which it is located (otherwise this means that the packet has been received from the (or from a) portal of the bridge to which these portals belong).

If yes (packet received from the bus), the process implemented at the interconnection equipment or portal makes provision for sending, in the course of step 1712, the packet to the item(s) of interconnection equipment or portal(s) constituting the bridge.

If not (packet received from the interconnection equipment or portal), the process implemented at the interconnection equipment or portal, in the course of step 1713, updates the path descriptor of the address resolution packet and sends it on the second bus, thus continuing the broadcasting of the packet across the bus network.

It is to be noted that in the course of step 1713 a test is also carried out to determine whether there is still some space available in the path descriptor to subsequently add further path identification information.

This test consists in comparing the field of second type representative of the path travelled with another predetermined end-of-transfer value representing an end-of-path which corresponds in this case to the marker.

The determination of the path terminates when the amount of information representing the path travelled by the packet reaches the end-of-transfer value.

Thus, with the path descriptor having a finite size, when this path descriptor of the address resolution packet can no longer be updated, the transmission or broadcasting of the said address resolution packet is stopped. This processing makes it possible to control the mechanism for propagation of the address resolution packet and in the same way makes it possible to detect and resolve the looping problems.

Following steps 1710, 1712 and 1713, processing of the address resolution packet is then terminated and the process reverts to its initial state (1701), awaiting a further packet.

FIG. 17 is a diagrammatic view of the algorithm of a method of receiving a data packet in response to the sending of an address resolution packet within an item of interconnection equipment or portal of a bridge (as bridge 1510 in FIG. 12) situated on the bus (bus 1504) where the equipment 1513 which is at the origin of the address resolution packet 1520 is located.

The instructions or steps of such a method are stored in the ROM memory of the bridge in question.

The reception of a response data packet (1531 or 1533 in FIG. 12) may assume two forms: either it relates to a response data packet sent out by a distant item of interconnection equipment or portal signifying the presence of the equipment sought on its bus, or it relates to a response data packet sent by an item of interconnection equipment or portal local to the source bus, and in this case it relates to the one and only one packet sent to the equipment which is at the origin of the address resolution packet.

In the course of reception step a test is carried out so as to ensure that the bridge is the source bridge. In practice, this test consists in detecting that the path to be travelled by the response packet has been fully consumed.

In the course of operation 1751, the process, of the portal of the bus where the equipment at the origin of the address resolution packet is located, places itself on standby for a response packet following the sending of an address resolution packet.

In the course of the following step 1752, the process makes provision for verifying whether a packet in response to the said address resolution packet has actually been received.

If yes, in the course of step 1753, the process makes provision for verifying whether the type of response packet received is a packet sent by an item of interconnection equipment or "portal" local to the bus (unique response packet sent to the equipment which is at the origin of the address resolution packet).

If not, in the course of step 1754, the response packet is acknowledged as described in the 1394-95 standard, the response packet being based on a request-type primary asynchronous packet, the latter should be acknowledged by a response-type packet. If not, the process carries on with processing via the operation 1760.

If the result of the verification carried out that step 1752 is negative, it is followed by step 1760.

In the course of step 1755, the process makes provision for verifying whether a response packet for the address resolution packet has already been received by the interconnection equipment or "portal" or detected on the "source" bus or whether a negative acknowledgement has not already been generated on the source bus.

If not, where a priori no response packet is expected, in the course of step 1758, the process makes provision to ignore the packet and to revert to the initial step 1751.

If yes, where a response packet is actually expected, in the course of step 1756, the process makes provision to memorise the reception or detection of a response packet.

Then, in the course of step 1757, in the case in which the previously received response packet was not already a single response packet sent to the equipment which is at the origin of the address resolution packet, the process makes provision to send a single response packet to the equipment 1513 which is at the origin of the address resolution packet 1520.

It is to be noted when the interconnection equipment or portal receives two response packets in a time shifted way, each determining a path travelled, that a further step (not represented in the drawings) of selecting one of the paths travelled is carried out.

The criteria of selection is, for example, the shortest path.

In the course of step 1760, the process makes provision to verify whether the maximum pre-defined waiting time has expired. The waiting time should be chosen correctly, for example in such a way that is longer than the longest outwards travelling time of an address resolution packet plus the travelling time of any corresponding response packet. If not, the process handles the error case in the course of operation 1761. If yes, step 1760 is followed by a step 1762.

In the course of step 1762, if no operation has been detected on the source bus, the process makes provision to send to the equipment which is at the origin of the address resolution packet a response packet signalling that no equipment responding to the source EUI-64 specified in the address resolution packet has been found, during the maximum allowed waiting time. The process then makes provision to return to the initial step 1751.

Figure 18:
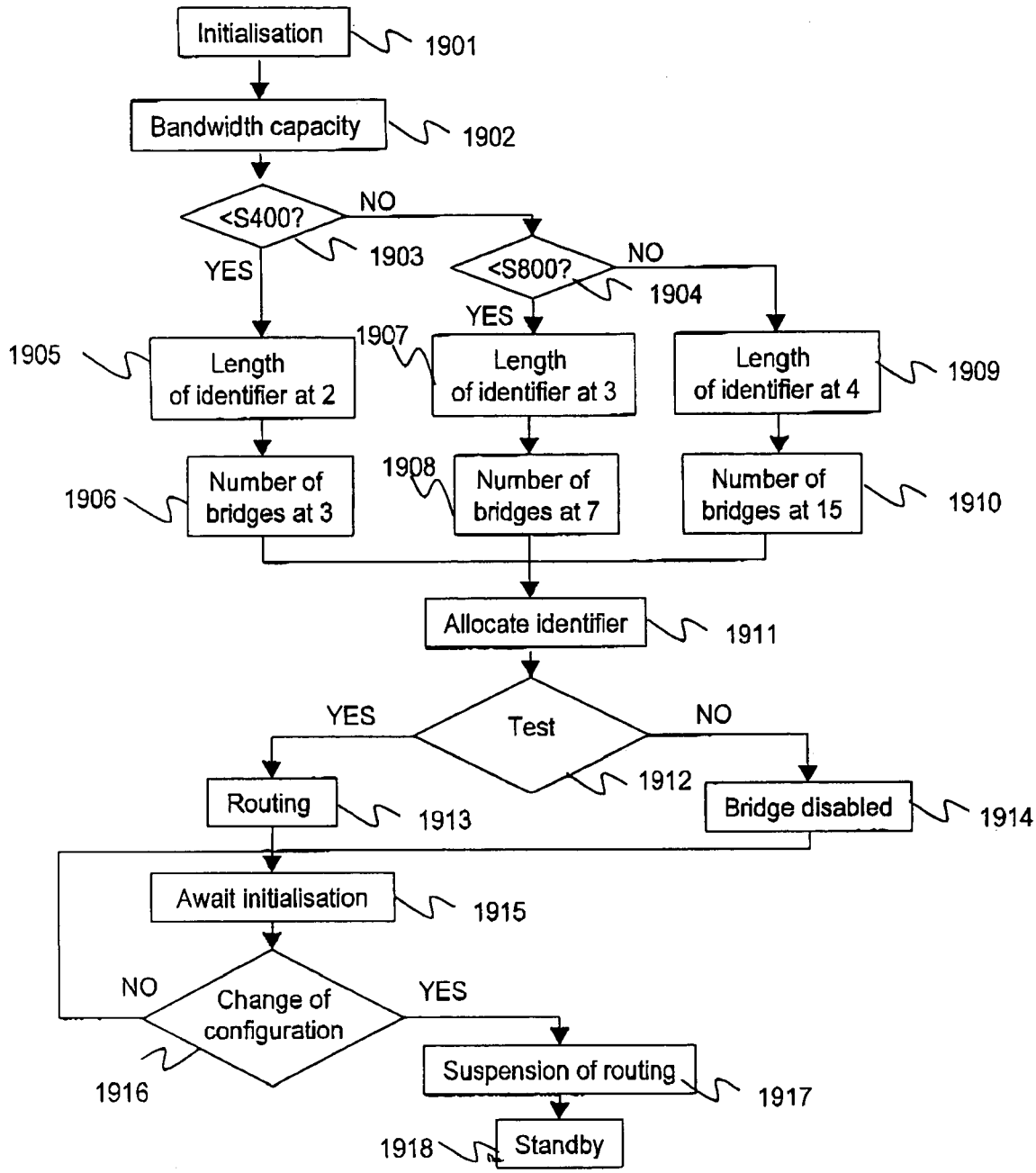
FIG. 18 is a diagrammatic view of the algorithm of a method of managing the length of the routing labels or identifiers within a bus on the basis of the capacity of the bus.

FIG. 18 is a diagrammatic view of the algorithm of the method of managing the length of the routing labels or bridge identifiers within a bus as a function of the capacity of the bus. The steps or instructions of this method are stored in a ROM memory of at least one of the bridges linked to the bus.

It should be noted that the bridge in question links two parts of a network together, one of the parts consisting of the bus linked to the said bridge.

In the course of step 1901, the method makes provision for detecting an event indicating a first initialisation of a bus to which the bridge is connected.

In the course of a step 1902, the bandwidth capacity for the said bus is determined (largest bandwidth common to all the peripherals present on this bus).

It should be noted that the bandwidth capacity or binary throughput of the bus constitutes a characteristic of it.

Next, in the course of step 1903, the method makes provision for verifying, for the bus, whether the capacity of the said bus in terms of bandwidth is less than the binary throughput referenced S400 by the standard 1394-95 (S400 signifying a throughput of 393.216 Mbit/s).

If not, in the course of step 1904, for the bus, it is checked whether this bandwidth capacity of the bus is less than the throughput referenced S800 by the 1394-95 standard (S800 signifying a throughput of 786.432 Mbit/s).

Depending on the value of the bandwidth capacity of the said bus, the method makes provision to fix, on the one hand, the length in bits of the routing label or identifier at the level of the said bus in the course of steps 1905, 1907 and 1909, then, on the other hand, the maximum number of bridges or of bridge-interconnection equipment items ("portals") allowed on the said bus ("max_bridge"), in the course of steps 1906, 1908 and 1910.

It will be noted that, for a length in bits of the routing label or identifier of n bits, only $2^n-1$ routing label or identifier values are allowed, since a particular value called separation value (marker or separator) is reserved.

In the course of step 1911, a constant and unique routing identifier is allocated to the interconnection equipment or "portal" of the bridge connected to the said bus. This routing identifier value is advantageously calculated in a similar way by all the interconnection equipment or "portals" from the knowledge of virtual identifiers associated with each item of interconnection equipment or "portal" of the bus in question.

For instance, the value of the routing identifier is defined for each item of interconnection equipment by increasing every time the value of the virtual identifier and, thus, the "alpha portal" will be allocated a routing identifier with the value 0.

In the course of step 1912, the method makes provision to verify, for the said bus, whether the value of the routing identifier allocated to the interconnection equipment or "portal" of the bridge in question is less than the maximum number of bridges allowed on the said bus. If not, in the course of step 1914, the bridge is set to the disabled state, and a peculiar value representing this "state" is set for the routing identifier of the interconnection equipment "portal" in question, then algorithm carries on with step 1915.

For example, if the coding of the identifiers takes place over 3 bits, it is impossible to identify more than seven bridges in an identification information field.

Hence, if an eighth bridge is connected to the bus, it will not be managed at bus level and no routing identifier will be allocated to it (bridge disabled).

If yes, in the course of step 1913, the various parameters and variables allowing the routing described in the present document to be implemented are initialised.

Step 1915 consists in awaiting an event of the bus-initialisation type ("bus reset").

If this event occurs, in the course of step 1916, the algorithm checks whether the configuration of the bridges at bus level has changed (for example a bridge has been newly connected or an existing bridge has been disconnected).

If not, the preceding step 1915 is returned to.

If yes, in the course of step 1917, implementation of the routing described in the present document is suspended in such a way that no further packet can enter the bus or leave this bus via the bridge.

Step 1918 consists in waiting for a sufficient pre-defined time ("timeout") so that any peripheral using this bridge in its path descriptor in order to communicate with a distant peripheral regards this path descriptor as obsolete. Consequently, the peripheral should, for example, again generate an address resolution packet before being able to resume any communication.

Next, step 1902 is carried out.

Another variant, not described here, consists, for example, during the time interval between suspension (step 1917) of the implementation of the routing described in the present document (step 1917) and re-enabling of this implementation of the routing, in acknowledging, in a particular way, any packet wishing to transit via the bridge.

Figure 19:
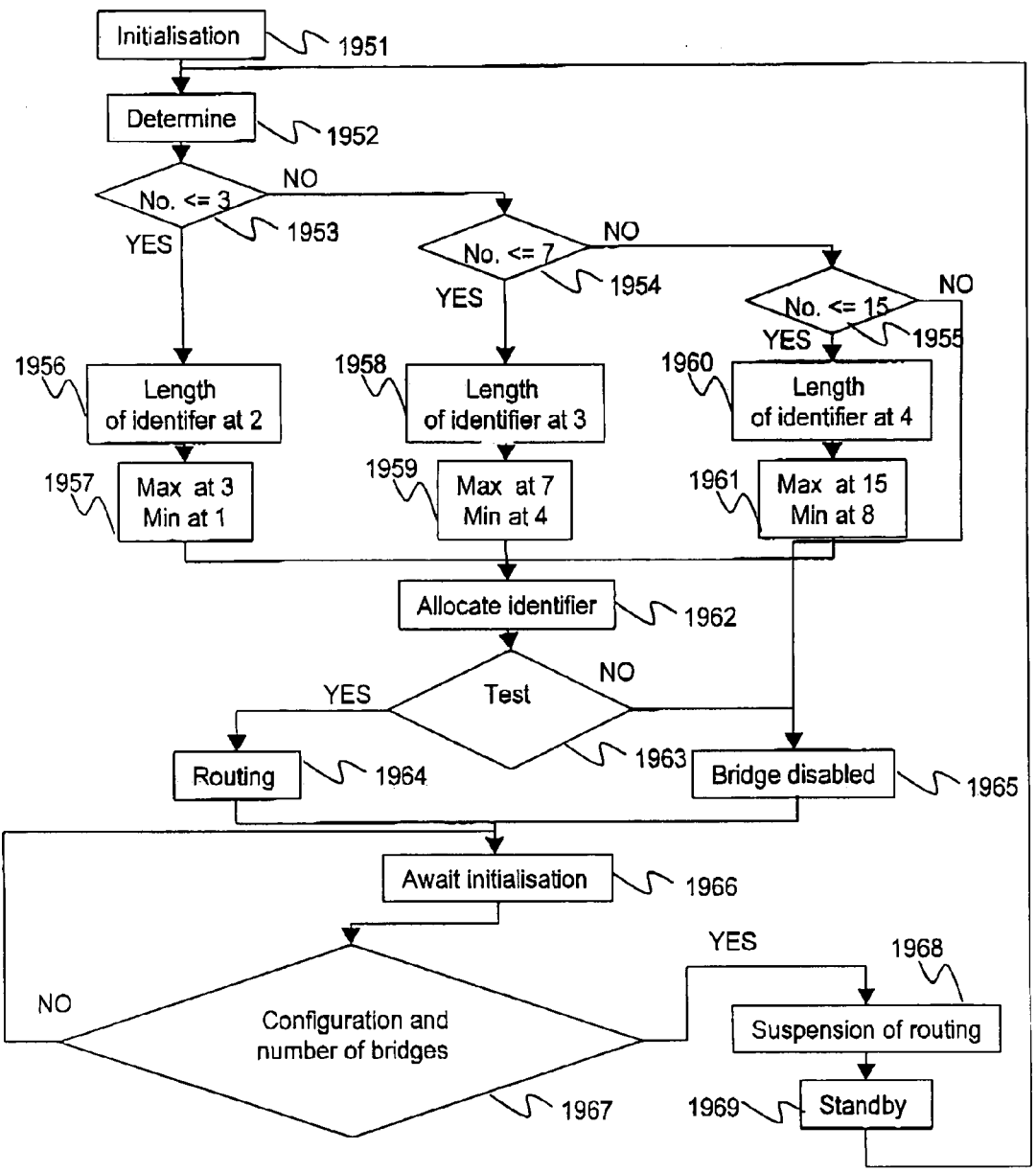
FIG. 19 is a diagrammatic view of the algorithm of a method of managing the length of the routing labels or identifiers within a bus on the basis of the number of bridges connected to the bus.

FIG. 19 is a diagrammatic view of the algorithm of a method of managing the length of the routing labels or bridge identifiers at the bus level as a function of the number of bridges and thus of interconnection equipment or "portals" connected to the bus. The steps or instructions of this method are stored in a ROM memory of at least one of the bridges linked to the bus.

The algorithm of this method strongly resembles that described above with reference to FIG. 18, the difference relating principally to the characteristic of the bus used to decide on the length of the routing label or identifier to be used.

In FIG. 18, this characteristic is the bandwidth or binary throughput capacity of a given bus, the objective being to avoid allowing too great a number of communications transiting on the said bus. To that end, a bridge is put into the "disabled" state so that it can no longer cause information to transit. It will be noted that, in the method of FIG. 18, the attempt is made to prevent any congestion.

In the algorithm of FIG. 19, the characteristic of the bus which is taken into account is the number of bridges or of items of interconnection equipment or "portals" connected to the said bus. Depending on the number of bridges on the said bus, a certain number of bits is necessary so as to be able to identify them all uniquely.

This algorithm also guards against using a bit needlessly for this identification. The algorithm also makes it possible to put a bridge into the "disabled" state in the event that too many bits are necessary for identification of the said bridge.

Other variants, not described in the present document, may easily be envisaged on the basis of other characteristics of a part of the network, for example a bus, which will be taken into account in the decision to allocate the length of the routing label or identifier to be used.

In the course of a step 1951, an event is detected indicating a first initialisation of a bus to which the bridge is connected.

Step 1952 determines, for the said bus, the number of bridges or items of interconnection equipment or "portals" present on this bus.

Next, the method makes provision to verify, for this bus, whether the number of bridges is less than 3 in the course of step 1953, otherwise whether it is less than 7 in the course of step 1954 and otherwise whether it is less than 15 in the course of step 1955. If not, the algorithm carries on with step 1965.

Depending on the value of the number of bridges connected to the said bus, the length in bits of the routing label or identifier within the said bus is set in the course of steps 1956, 1958 and 1960, then, moreover, the maximum number of bridges or of items of interconnection equipment or "portals" allowed on the said bus ("max_bridge"), as well as the minimum number of items of interconnection equipment or "portals" for the said length in terms of bits of the routing label or identifier ("min_bridge"), in the course of steps 1957, 1959 and 1961.

In the course of step 1962, a constant and unique routing identifier is allocated to the interconnection equipment or "portal" of the bridge connected to the said bus. This routing identifier value is advantageously calculated in a similar way by all the interconnection equipment or "portals". For instance, the value of the routing identifier is defined for each item of interconnection equipment by increasing every time the value of the virtual identifier and, thus, the "alpha portal" will be allocated a routing identifier with the value 0.

In the course of step 1963, the method makes provision to verify, for the said bus, whether the value of the routing identifier allocated to the interconnection equipment or "portal" of the bridge in question is less than the maximum number of bridges allowed on the said bus.

If not, in the course of step 1965, the bridge is set to the disabled state, and a peculiar value representing this "state" is set for the routing identifier of the interconnection equipment of "portal" in question, then the algorithm carries on with step 1966.

If yes, in the course of step 1964, the various parameters and variables allowing the routing described in the present document to be implemented are initialised.

Step 1966 consists in awaiting an event of the bus-reset type. If this event occurs, in the course of step 1967, the algorithm checks whether the configuration of the bridges at bus level has changed (for example a bridge has been newly connected or an existing bridge has been disconnected), and whether the number of bridges or items of interconnection equipment ("portals") is outside the interval defined in advance by min_bridge and max_bridge.

If not, the algorithm returns to the preceding step 1966.

If yes, in the course of step 1968, implementation of the routing described in the present document is suspended in such a way that no further packet can enter the bus or leave this bus via the said bridge.

Step 1969 consists in waiting for a sufficient pre-defined time ("timeout") so that any peripheral using this bridge in its path descriptor in order to communicate with a distant peripheral regards this path descriptor as obsolete. Consequently, the peripheral should, for example, again generate an address resolution packet before being able to resume any communication.

Next, step 1952 is carried out.

It should be noted that, when a bridge links two parts of a network together, two different identifier lengths may be determined respectively for the two items of interconnection equipment or "portals" of the bridge in question on the basis of two respective characteristics specific to each of the said two parts of the network.

Hence, in such an eventuality, the marker which delimits two identification information fields, respectively of the path to be travelled and travelled by the data packet, has its size or length varied as a consequence, so that the difference in size or length between the two identifiers of the two items of interconnection equipment or "portals" has no incidence on the total length of the field consisting of the marker and of the two identification information fields, which should be fixed.

In the foregoing description, given by reference to FIGS. 18 and 19, it has just been explained that the length of a routing label or identifier is adapted at the level of interconnection equipment on the basis of characteristic(s) specific to a part of the network to which the said equipment is linked, and that an identifier having this adapted length is allocated to at least one item of interconnection equipment linked to this part of the network.

This makes it possible, in particular, to use the resources in terms of routing identifiers more effectively at the level of a bus to which several interconnection equipment items are linked.

It is explained, however, that certain interconnection equipment items of a given bus may not be allocated routing identifiers due to insufficient routing identifier resources of the level of this bus.

This may prove to be prejudicial for the performance of the network, since certain bridges will then be "de-activated" and will therefore not allow data packets to be transferred.

The invention, the description of which will follow, aims to manage the resources in terms of routing identifiers more effectively at the level of a part of a network and, for example, of a bus.

Figures 20, 21:
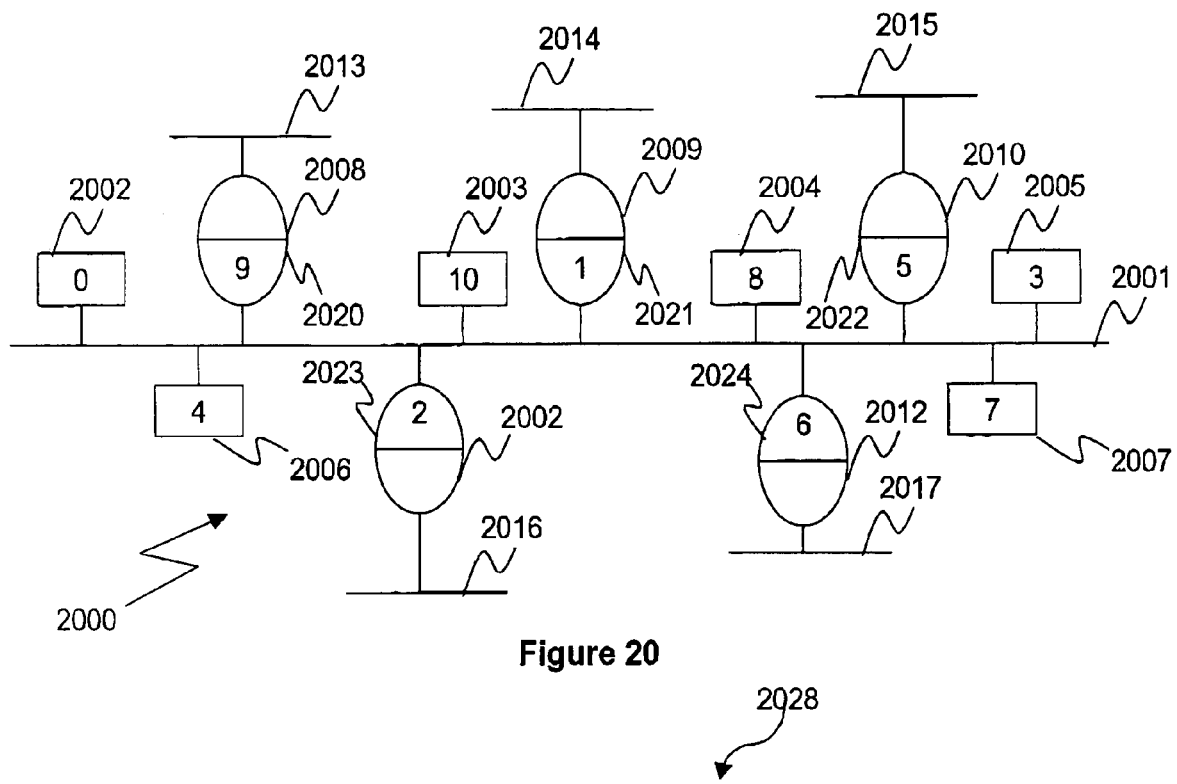
FIG. 20 is a partial diagram of a bus network.
FIG. 21 is a diagram of a correspondence table for an interconnection equipment in FIG. 20.

As represented partially in FIG. 20, a network 2000 according to the invention, of a type in accordance with the 1394 standard, includes a serial communications bus 2001, equipment of peripheral type, called applications equipment 2002 to 2007 and interconnection equipment forming part of bridges numbered 2008 to 2012 and making it possible to connect the bus 2001 with other buses numbered 2013 to 2017 respectively.

The items of interconnection equipment linked to the bus 2001 are referenced 2020 to 2024.

It should be noted that each bridge of FIG. 20 has, for example, the appearance of the bridge denoted 2009 and represented in FIG. 3.

In FIG. 3, the elements of the bridge which are referenced 1012, 1014, 1016, 1018, 1020, 1022, 1024, 1026, 1028, 1034, 1036, 1038, 1040, 1042 and 1044 are common to each of the items of interconnection equipment or "portals" of this bridge, and only the blocks of PHYLINK 1394 components denoted 1030 and 1032 are specific respectively to each item of interconnection equipment.

Hence, each item of interconnection equipment 2020 to 2024 of FIG. 20 includes a block of PHYLINK 1394 components identical to the block 1030 or 1032 of FIG. 3, and the other elements set out above and which are common to each of them.

However, in certain cases, the interconnection equipment or "portals" of a bridge are physically remote (the case of a radio link) and the other elements set out above are then specific to each of the items of interconnection equipment.

In an identical way to what is represented in FIG. 3, the bridges 2008 to 2012 can be integrated into data-processing apparatus (for example a computer) or may themselves constitute the said apparatus.

In FIG. 3, the bridge 2009 is integrated into a programmable device which is, for example, a computer 2027.

In this example, the device for allocating a routing identifier according to the invention consists of a block of PHYLINK 1394 components identical to the block 1030 or 1032 of FIG. 3 and of elements referenced 1012, 1014, 1016, 1018, 1020, 1022, 1024, 1026, 1028, 1034, 1036, 1038, 1040, 1042 and 1044 in this same Figure.

In the remainder of the explanation, attention will focus particularly on the bridge denoted 2009 which directly links the bus 2001 (and indirectly the buses 2016 and 2017), regarded as a first part of the network in the sense of the invention, to the bus 2014, regarded as a second part of the network in the sense of the invention.

For this bridge and all the other bridges linked to the bus 2001 to make it possible to transfer data packets from one bus to another bus, it is necessary to identify them by allocating them routing labels or identifiers.

The allocation of the routing identifiers is based on a mechanism for enumerating different items of equipment (peripherals, interconnection equipment, etc.) present on a bus.

This enumeration mechanism is used every time an item of equipment is added or removed from a bus, and includes several phases.

During a first phase, an identifier called physical identifier is allocated uniquely to each of the equipment items 2002 to 2012 by processing packets called auto-identification packets ("or self-ID packets").

Hence, each bridge is allocated two physical identifiers by each of the two buses to which it is connected, each identifier being associated with equipment for interconnecting the said bridge or "portal".

In FIG. 20, the interconnection equipment 2020 to 2024 is respectively allocated the physical identifiers denoted 9, 1, 5, 2, and 6, while the applications peripherals 2002 to 2007 are allocated the physical identifiers denoted 0, 10, 8, 3, 4 and 7 respectively.

During this first phase, the interconnection equipment items on the same bus identify themselves to one another.

Hence, any item of interconnection equipment on a bus recognises the physical identifier associated with each of the other interconnection equipment items on the same bus.

Following power being applied to a set of equipment items on the same bus, a second phase gives rise to a phase of allocating an identifier called virtual identifier to all the equipment present on the bus, as a function of the position of the interconnection equipment having the largest physical identifier.

This interconnection equipment, denoted 2020 in FIG. 20, is thus referenced "alpha-portal" and bears a virtual identifier equal to 0.

This phase of allocating a virtual identifier is carried out according to predetermined rules which are described particularly in version 0.04 of February 1999 of the IEEE draft specification P1394.1.

Hence, within each item of interconnection equipment of the bus, a table of identity correspondence is obtained between the physical identifier and the virtual identifier of all the equipment connected to the bus.

This table, denoted 2028 is represented moreover in FIG. 21 and is stored in the RAM memory 1016 of FIG. 3.

The subsequent phases of the registration mechanism give rise to a comparison between the old and the new topology of the bus, in accordance with common procedures, which allows each interconnection equipment on the bus to establish in an identical manner an identifier correspondence table which it then holds, in order to keep constant the value of the virtual identifier associated with each equipment connected to the bus.

In this way, viewed from the exterior of the bus, the values of the virtual identifiers remain unchanged, regardless of any modification to the topology of the bus under consideration.

FIG. 21 illustrates the correspondence table, which is updated in an identical fashion by all the interconnection equipment or "portals" on the 2001 bus, providing, for every peripheral on the bus, information concerning the value of its physical identifier, represented in the first column, as a function of its virtual identifier, represented in the second column.

A third column represents the identifier or routing label associated with each interconnection equipment or "portal", allocated in a first instance, in ascending order corresponding to the value of the virtual indicator.

The interconnection equipment or "portals" to which identifiers or routing labels are allocated are placed in a "state" known as "active" and are represented by lines a, b and c in the routing table.

It relates to the interconnection equipment 2020 and 2024 which bear the physical indicators 1, 5 and 2 respectively in FIG. 20.

The interconnection equipment or "portals" to which identifiers or routing labels are not allocated are placed in a "state" known as "waiting" or "disabled" and are represented by lines d and e in the routing table.

It relates to the interconnection equipment 2021, 2022 and 2023 which bear the physical indicators 9 and 6 respectively in FIG. 20.

Allocation of identifiers or routing labels and their management as well as that of the "state" of the different interconnection equipment or "portals" is described more fully in the text of the explanation.

Figure 22:
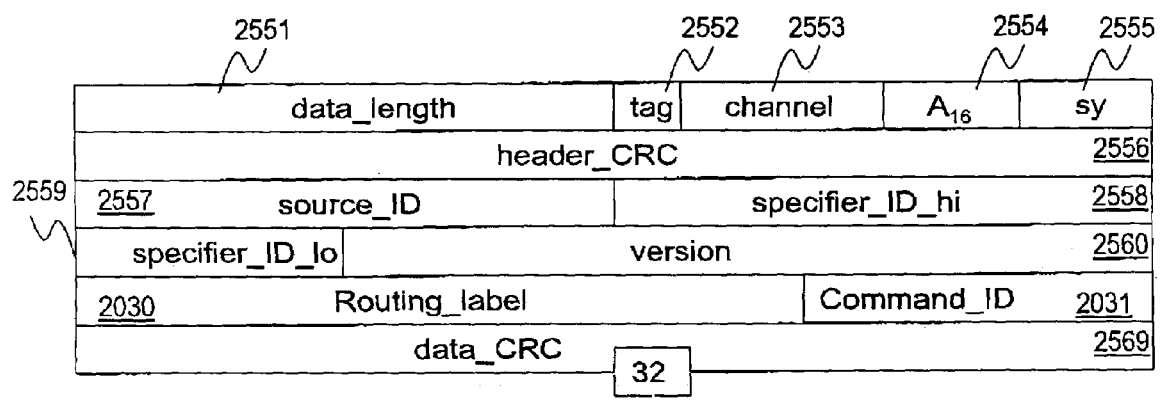
FIG. 22 is a diagram representing the format for an allocation or reservation command for a routing identifier.

FIG. 22 represents the structure of a GASP type data packet analogous to that represented in FIG. 13.

This packet is transmitted solely on the local bus 2001 to convey the commands called "release_RL_cmd" and "allocate_RL_cmd" which relate to the releasing and reservation respectively (reservation is a particular phase of allocation which requires a command to be sent) of an identifier or routing label.

This packet differs from that in FIG. 13 because it does not contain the fields denoted 1561 and 1567 and includes besides two supplementary fields called "Routing_label" marked 2030 and "Command_ID" marked 2031.

The field "Routing_Label" contains the value of the identifier or routing label which is the subject of the command in question.

As for the field "Command_ID", this is used to differentiate the command for the release of the identifier or routing label ("release_RL_cmd") from the command for the reservation of the identifier or routing label ("allocate_RL_cmd").

The other fields, marked 1551 to 1560 and 1569 in this Figure are identical to the fields in FIG. 13 and bear the same references.

Figure 23:
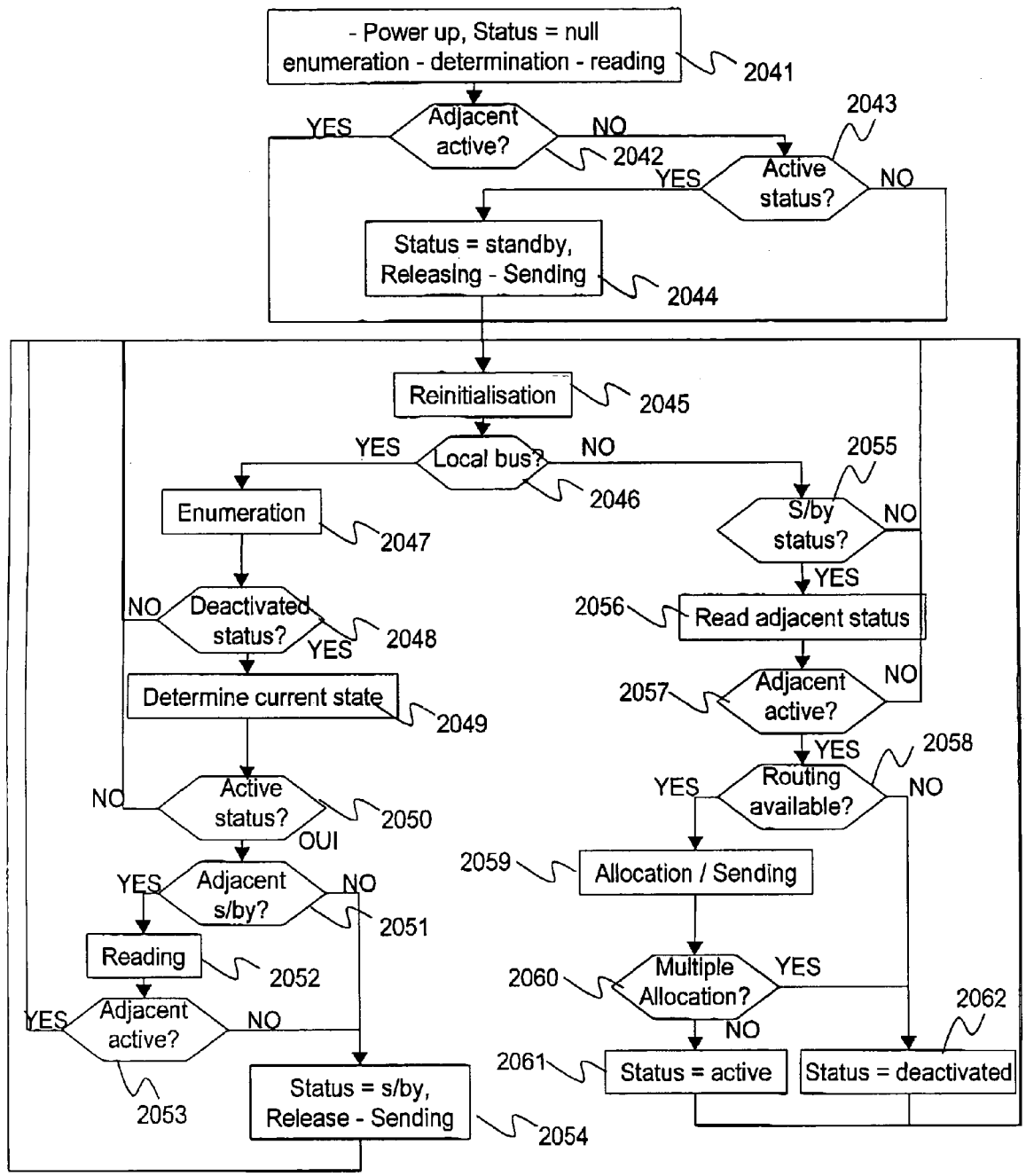
FIG. 23 is a diagram of the algorithm for allocating a routing identifier which is implemented at the level of each interconnection equipment in FIG. 20.

FIG. 23 represents an algorithm on which, according to the invention, the method of allocation of a routing identifier is based and which is implemented at the level of each interconnection equipment on the network.

The different instructions or steps in this method form part of a computer program (software code portions) stored in the ROM for each bridge, which is analogous to the ROM for the bridge in FIG. 3.

The "state" of each interconnection equipment or "portal" in a bridge, called the first interconnection equipment according to the invention (for example denoted 2021 in FIG. 20), is identified by a variable known as "state" which is memorised in the "CNC_STATE" register contained in the "portal_numbering" register in FIG. 4.

The "state" of the other interconnection equipment or "portal", called the second interconnection equipment according to the invention (For example, the second portal of the bridge 2009 having the first portal 2021 in FIG. 20), with which each first interconnection equipment forms a bridge is identified by a variable "state" which is memorised in the "ADJ_CNC_STATE" register contained in the same register "portal_numbering" in FIG. 4 as the "CNC_STATE" register.

When it is switched on (step 2041), the CPU arithmetic unit for each interconnection equipment or "portal" or for each bridge, as represented in FIG. 3, executes the program, based on the algorithm in FIG. 23, which is stored in the ROM and each interconnection equipment or "portal" sets its state variable to a value of zero in the "CNC_STATE" register.

After it has registered all the apparatus connected to the bus and determined the routing table (FIG. 21), the first interconnection equipment or "portal" determines its current "state" as a function of the availability of an identifier or routing label, according to the contents of the correspondence table.

It memorises the value of its current "state", "active" or "disabled" in the "CNC_STATE" register.

It then recovers the value of the "state" of the second interconnection equipment or "portal" (qualified likewise as "adjacent") and memorises it in the ADJ_CNC_STATE register.

A test carried out at step 2042 relates to the determination (analysis) of the contents of the "ADJ_CNC_STATE" register.

The determination of the "state" of the second interconnection equipment or "portal" will help with the taking of a decision relating to the allocation of an identifier or routing label to the first interconnection equipment or "portal".

If the contents of the register do not equal "active", the bridge under consideration will not be able to transfer packets from one bus to the other and step 2043 is then implemented, if not step 2045 will be executed.

A test carried out at the time of step 2043 relates to the determination (analysis) of the contents of the "CNC_STATE" register.

If the contents of this register are equal to "active", there is no point in keeping a resource (routing identifier) allocated to this interconnection equipment and step 2044 is then executed, if not then step 2045 follows on directly.

Step 2044 consists of releasing an identifier or routing label by transmitting a "release_RL_cmd" command, the structure of which is represented in FIG. 22 and which is designed to inform all the interconnection equipment on the 2001 bus that an identifier is in future no longer allocated.

The field "Command_ID" of the transmitted command contains the value of the identifier or routing label which should have been associated with the first interconnection equipment or "portal".

This identifier or routing label is then released as being the next available identifier or routing label (not allocated) and which is to take into account at the time of the next reset of the bus or at the time of the next attempt to allocated an identifier or a routing label.

The subsequent step 2045 consists of waiting for the next event of reset of one of the two buses connected to the bridge under consideration. When a reset of the bus occurs, the test in step 2046 is executed.

When this test is positive, it signifies that the reset relates to the 2001 bus connected to the first interconnection equipment or "portal" and step 2047 is then implemented.

In the opposite case, the reset has just taken place on the adjacent bus, for example, bus 2014 if the bridge 2009 is under consideration and step 2055 is executed.

Steps 2047 to 2054 describe the processes implemented at the time of a reset on the local 2001 bus, and steps 2055 to 2062 describe the processes implemented at the time of a reset on the adjacent bus (for example the 2014 bus).

Step 2047 repeats the registration phase for the equipment (peripherals, interconnection equipment or "portals") which possibly updates the correspondence table for each interconnection equipment or portal when a change of state occurs and then the test in step 2048 is carried out. This test does not take into account the possible updating.

The test in step 2048 is positive if the value of the "CNC_STATE" register is equal to "disabled". If the test is negative, step 2045 is executed once more.

When the value of the "CNC_STATE" register is equal to "disabled", step 2049 updates the value of the said "CNC_STATE" register as a function of the contents of the correspondence table (FIG. 22) and then the test in step 2050 is carried out.

The test in step 2050 is positive if the value of the "CNC_STATE" register is equal to "active", which indicates a change of "state" to the first interconnection equipment or "portal", knowing that an identifier or routing label has previously been released at the time of step 2047.

If this test is negative, step 2045 is executed once more.

When the value of the "CNC_STATE" register is equal to "active", a test is carried out during the subsequent step 2051 and it is positive if the value of "ADJ_CNC_STATE" register is equal to "waiting", which indicates that the second interconnection equipment or "portal" is ready to receive an identifier or routing label.

If this test is negative, then step 2054 is executed.

When the value of the "ADJ_CNC_STATE" register is equal to "standby", the subsequent step 2052 consists of updating the contents of the "ADJ_CNC_STATE" register as a function of the result of the attempt by the second interconnection equipment or "portal" to receive an identifier or routing label.

Before executing step 2052, the second interconnection equipment or "adjacent portal" must, for its part, have executed step 2061 or 2062 in order to set the contents of its "CNC_STATE" register to the value corresponding to the "state" "active" or "disabled", which will become the new value of the "ADJ_CNC_STATE" register of the first interconnection equipment or "portal".

Figure 24:
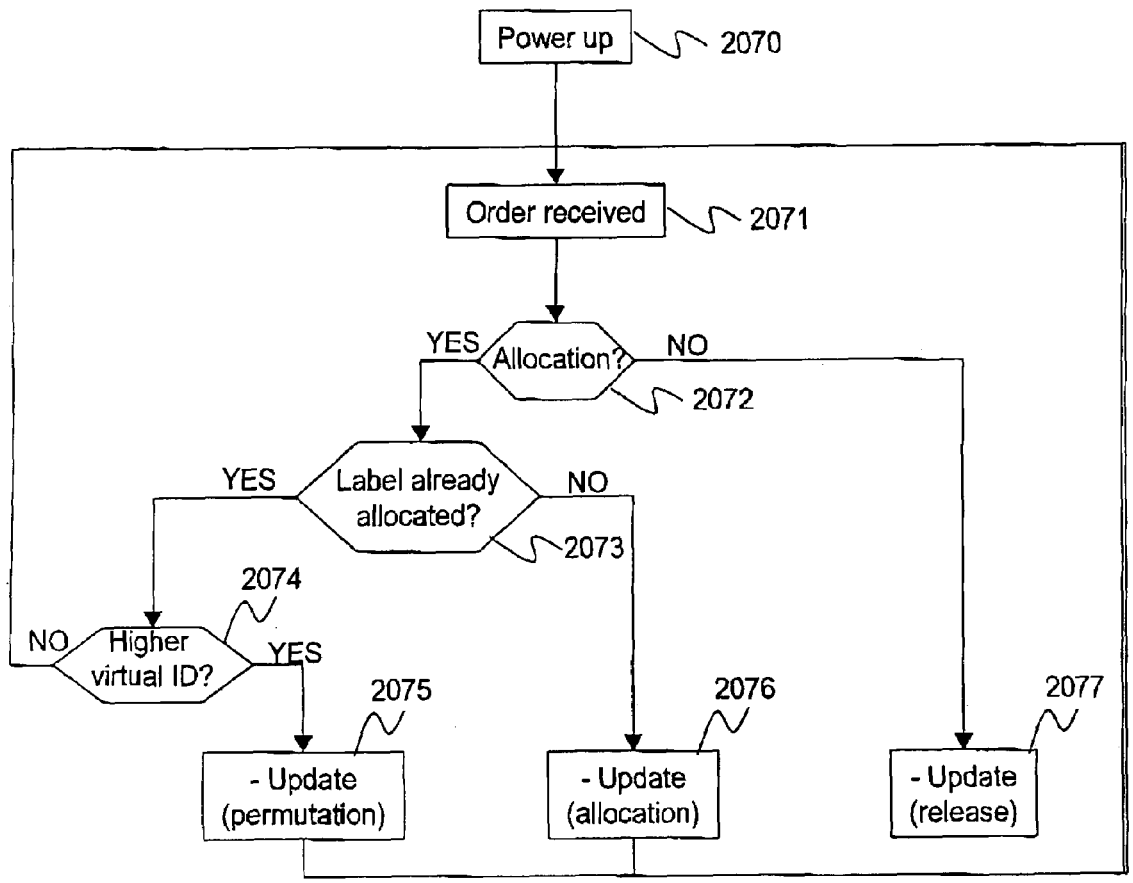
FIG. 24 is a diagram of the algorithm for a method of reception for an allocation or reservation command and which is implemented at the level of each interconnection equipment in FIG. 20.

It should be noted that each interconnection equipment or "portal" in the network executes the same algorithm as that in FIGS. 23 and 24 and that a case which appears not to have been taken into account at the level of the first interconnection equipment or "portal" is in fact taken into account at the level of the second interconnection equipment or "portal".

The new contents of this register is determined (analysis) in the course of the test carried out in step 2053.

If the contents of the "ADJ_CNC_STATE" register is equal to "active" then the bridge is activated once more in order to effect transfers of packets from one bus to the other, if not step 2054 is carried out.

Step 2054 characterises the process to be carried out when the attempt to reactivate the bridge under consideration has failed as a result of the "state" of the second interconnection equipment or "portal" which is "disabled". This process corresponds to the process carried out at the time of step 2044 and which has been described above.

Moreover, when a reset of bus adjacent to the 2001 bus, for example the 2014 bus if this is relevant to bridge 2009, occurs (test 2046 negative) a step 2055, consisting of testing the contents of the "CNC_STATE" register for the first interconnection equipment or "portal" is carried out.

If the contents of this register is equal to "waiting", the subsequent step 2056 is carried out, if not then it waits for the next reset of the bus (step 2045).

Step 2056 consists of updating the contents of the "ADJ_CNC_STATE" register for the first interconnection equipment or "portal" as a function of the result of the attempt by the second interconnection equipment or "portal" to acquire an identifier or routing label.

Before executing step 2056, the second interconnection equipment or "portal" must, for its part, have executed steps 2047 to 2049, in order to set the contents of its "CNC_STATE" register to the value corresponding with the "active" or "disabled" "state" which will become the new value in the "ADJ_CNC_STATE" register.

The new contents of this register is determined (analysis) during a test 2057.

If the contents of the "ADJ_CNC_STATE" register is equal to "active", which means that the second interconnection equipment or "portal" is once more "activated", the first interconnection equipment or "portal" tries to allocate an identifier or routing label and step 2058 is carried out.

In the opposite case, step 2045 is carried out once more.

A test provided for in step 2058 is the result of an attempt to allocate an identifier or routing label to the first interconnection equipment or "portal".

This test fails if there is no identifier or routing label available, and then step 2062 is executed.

If the test in the subsequent step 2058 is successful, the subsequent step 2059 consists of allocating an identifier or routing label by means of transmission of a command "allocate_RL_cmd", the structure of which is represented in FIG. 22 and which is designed to inform all the interconnection equipment or "portals" on the 2001 bus that an identifier or routing label has just been allocated.

The field "Command_ID" in the transmitted command contains the value of the identifier or routing label capable of being allocated to the first interconnection equipment or "portal". This identifier or routing label is not then available for another interconnection equipment or "portal" on the 2001 bus.

At the time of the subsequent step 2060, a test is carried out which guarantees that the same identifier or routing label has not been reserved simultaneously by two interconnection equipment or "portals" on the same bus. As a consequence, it involves, over a period of about 1 ms, analysing the allocation commands for the identifier or routing label which can be transmitted by other interconnection equipment or "portals" on the bus and verifying that the field "Command_ID" includes the same value as that for the command transmitted in the previous step 2059.

In the positive case, and if the value of the virtual indicator for the interconnection equipment or "portal" is less than that for the remote interconnection equipment or "portal" which has sent the second command, the identifier or routing label is allocated to the remote interconnection equipment or "portal" and step 2062 is carried out.

In the opposite case, the subsequent step is step 2061, which consists of setting the contents of the "CNC_STATE" register to the "active" value and the bridge is once more "activated".

The next reset of the bus (step 2045) is then awaited.

Step 2062 consists of setting the contents of the "CNC_STATE" register to the "disabled" value and the first interconnection equipment or "portal" the responsible for the ongoing de-activation of the bridge.

The next reset of the bus (step 2045) is then awaited.

FIG. 24 represents an algorithm on which is based, according to the invention, a method of reception for a command to release or reserve an identifier or routing label and which is implemented at the level of each interconnection equipment or "portal" on the network in FIG. 20.

The various instructions or steps of this process form part of a computer programme stored in the ROM of the bridge in FIG. 3.

The CPU for each interconnection equipment or "portal", or for each bridge, as represented in FIG. 3, executes the program stored in ROM and based on the algorithm in FIG. 24.

After the bridge under consideration, connected to the 2001 bus, is switched on, (step 2070), the subsequent step 2071 is executed.

The interconnection equipment or "portal" connected to the 2001 bus is then waiting to receive a release or reservation command for an identifier or routing label, the structure of which is represented in FIG. 22.

When such a command is received, a test provided for in the subsequent step 2072 is executed.

This test allows the differentiation between the processing associated with a reservation command ("allocation") for an identifier or routing label, steps 2073 to 2076, from a release command for an identifier or routing label, step 2077.

If a reservation command (("allocation") is received, a test planned for the subsequent step 2073 is first of all executed in order to determine whether the identifier or routing label associated with the reservation command in the field "Routing_label" in FIG. 22 has already been allocated in the routing table in FIG. 21.

In the affirmative, the test provided for in step 2074 is executed.

Test in step 2074 consists of determining whether the value of the virtual identifier associated with the physical identifier in the field "source_ID" of the reservation command (FIG. 22) is greater than the value of the virtual identifier in the correspondence table to which the identifier or routing label has been allocated.

In the negative, step 2071 is executed once more, if not the next move is to step 2075.

This final step 2075 corresponds to a permutation in the routing table (FIG. 21) of the "states" of the two virtual identifiers considered at the time of the previous test during step 2074.

If the test provided for in step 2073 is negative, then the next move is to step 2076, which corresponds to setting the state to "active", thus to assigning the next available identifier or routing label of the virtual identifier associated with the physical identifier in the field "source_ID" in the reservation command (FIG. 22).

If a release command is received, step 2072 is followed by a step 2077.

This step 2077 corresponds to setting the "state" of the virtual identifier associated with the physical identifier in the field "source_ID" of the release command to "waiting" (FIG. 22).

The invention thus allows, first, more effective management of limited resources such as identifiers or routing labels in a network and, notably, at the bus level, on one side, in not initially assigning a routing label to a first interconnection equipment or "portal" of which the second interconnection equipment or "portal" is disabled and on the other side, releasing an identifier allocated to such a first interconnection equipment or "portal" when the allocation has already occurred.

The identifier or routing label which was previously allocated then becomes the next identifier or label available.

It should be noted that, when commands are sent simultaneously on two parts of a network connected by a bridge, as for example the 2001 and 2014 buses, which are connected by the bridge 2009, it is possible to arrive at a blocking situation if the "state" of each interconnection equipment or "portal" of the said bridge is modified at the same moment. Thus, to avoid this situation, it is useful to desynchronise the sending of commands between the various interconnection equipment or "portals" on the same bus, and between the two parts of the network, for example by slowing down the speed of sending of the commands from one of the interconnection equipment or "portals" of the bridge considered with reference to the speed of sending of commands from the other interconnection equipment or "portal" of the said bridge as a function of the value of the virtual identifier which has been attributed to them.

The present invention can equally be used to optimise the management of identifiers or routing labels at the time when a local loop is detected.

A local loop is defined as being realised by the connection of two adjacent buses by two different bridges. In such a case, one of the two bridges can then be suppressed.

When one of the two bridges is deleted, it is sufficient to sent a release command for an identifier or routing label, as long as the topology relative to the bridges, on one of the two buses, is not modified.

A modification to the topology would consist of deleting the bridge in question.

A specific release command "release_RL_tmp_cmd" will then be able to be sent in accordance with the format represented in FIG. 22 and corresponds to the temporary release of an identifier or routing label.

The effect of this command will cease from the moment that a bridge on one of the two buses concerned is removed.

It should be noted that this release command is not associated with a reservation command (allocation) for an identifier or routing label.

The invention claimed is:

1. A method of assigning at least one routing identifier to at least one piece of interconnection equipment of at least one bridge in a network, the bridge comprising at least two pieces of interconnection equipment, a first of which is connected to a first part of the network and a second of which is connected to a second part of the network, said method comprising the steps of:

determining a state of the second piece of interconnection equipment of the bridge;

assigning an available routing identifier to the first piece of interconnection equipment based on the determined state of the second piece of interconnection equipment, wherein a routing identifier is deemed available if it has not already been assigned to any piece of interconnection equipment of another bridge connected to a subpart of said first part of the network; and desynchronizing commands sent over the first and second parts of the network, respectively.

2. A method of assigning at least one routing identifier to at least one piece of interconnection equipment of at least one bridge in a network, the bridge comprising at least two pieces of interconnection equipment, a first of which is connected to a first part of the network and a second of which is connected to a second part of the network, said method comprising the steps of:

determining a state of the second piece of interconnection equipment of the bridge;

assigning an available routing identifier to the first piece of interconnection equipment based on the determined state of the second piece of interconnection equipment, wherein a routing identifier is deemed available if it has not already been assigned to any piece of interconnection equipment of another bridge connected to a subpart of said first part of the network; and altering the transmission speed of a command from the first piece of interconnection equipment of the bridge with reference to the at least one second piece of interconnection equipment of the bridge.

3. A method of assigning at least one routing identifier to at least one piece of interconnection equipment of at least one bridge in a network, the bridge comprising at least two pieces of interconnection equipment, a first of which is connected to a first part of the network and a second of which is connected to a second part of the network, said method comprising the steps of:

determining a state of the second piece of interconnection equipment of the bridge;

assigning an available routing identifier to the first piece of interconnection equipment based on the determined state of the second piece of interconnection equipment, wherein a routing identifier is deemed available if it has not already been assigned to any piece of interconnection equipment of another bridge connected to a subpart of said first part of the network; and desynchronizing commands sent respectively between the various pieces of interconnection equipment connected to the first part of the network.

4. The method according to claim 3, wherein the desynchronization is adapted as a function of the value of a virtual identifier for each piece of interconnection equipment.

5. A device for assigning at least one routing identifier to at least one piece of interconnection equipment of at least one bridge in a network, the bridge comprising at least two pieces of interconnection equipment, a first of which is connected to a first part of the network and a second of which is connected to at least one second part of the network, said device comprising:

determining means for determining a state of the second piece of interconnection equipment of the bridge;

assigning means for assigning an available routing identifier to the first piece of interconnection equipment based on said determined state of the second piece of interconnection equipment, wherein a routing identifier is deemed available if it has not already been assigned to any piece of interconnection equipment of another bridge connected to a subpart of said first part of the network; and desynchronizing means for desynchronizing commands sent over the first and second parts of the network, respectively.

6. A device for assigning at least one routing identifier to at least one piece of interconnection equipment of at least one bridge in a network, the bridge comprising at least two pieces of interconnection equipment, a first of which is connected to a first part of the network and a second of which is connected to at least one second part of the network, said device comprising:

determining means for determining a state of the second piece of interconnection equipment of the bridge;

assigning means for assigning an available routing identifier to the first piece of interconnection equipment based on said determined state of the second piece of interconnection equipment, wherein a routing identifier is deemed available if it has not already been assigned to any piece of interconnection equipment of another bridge connected to a subpart of said first part of the network; and altering means for altering the transmission speed of a command from the first piece of interconnection equipment of the bridge by reference to the second piece of interconnection equipment of the bridge.

7. A device for assigning at least one routing identifier to at least one piece of interconnection equipment of at least one bridge in a network, the bridge comprising at least two pieces of interconnection equipment, a first of which is connected to a first part of the network and a second of which is connected to at least one second part of the network, said device comprising:

determining means for determining a state of the second piece of interconnection equipment of the bridge;

assigning means for assigning an available routing identifier to the first piece of interconnection equipment based on said determined state of the second piece of interconnection equipment, wherein a routing identifier is deemed available if it has not already been assigned to any piece of interconnection equipment of another bridge connected to a subpart of said first part of the network; and desynchronizing means for desynchronizing commands sent respectively between various pieces of interconnection equipment connected to the first part of the network.

* * * * *

UNITED STATES PATENT AND TRADEMARK OFFICE
CERTIFICATE OF CORRECTION

| | |
|---|---|
| PATENT NO. | : 7,099,322 B1 |
| APPLICATION NO. | : 09/535546 |
| DATED | : August 29, 2006 |
| INVENTOR(S) | : Laurent Frouin et al. |

It is certified that error appears in the above-identified patent and that said Letters Patent is hereby corrected as shown below:

ON TITLE PAGE AT ITEM (56) OTHER PUBLICATIONS

"Boucachard, P," should read --Boucachard, P.,--.

SHEET 15

FIG. 16, "Equipement" should read -- Equipment--.

COLUMN 2

Line 40, "No. 9903755" should read --N° 9903755--.

COLUMN 10

Line 67, "identifier," should read --identifier;--.

COLUMN 11

Line 3, "FIG. 20;" should read --FIG. 20; and--; and
Line 7, "FIG. 20;" should read --FIG. 20.--.

COLUMN 15

Line 47, "register" should read --registers--.

COLUMN 25

Line 43, "step" should read --Step--.

COLUMN 36

Line 10, "in" should read --(in--.

COLUMN 46

Line 5, "is" should read --are--;
Line 7, "is" should read --are--;
Line 36, "is" should read --are--; and
Line 38, "is" should read --are--.

UNITED STATES PATENT AND TRADEMARK OFFICE
CERTIFICATE OF CORRECTION

PATENT NO. : 7,099,322 B1
APPLICATION NO. : 09/535546
DATED : August 29, 2006
INVENTOR(S) : Laurent Frouin et al.

It is certified that error appears in the above-identified patent and that said Letters Patent is hereby corrected as shown below:

<u>COLUMN 47</u>

Line 18, "the" (first occurrence) should read --is--; and
      Line 46, "(("allocation")" should read --("allocation")--.

<u>COLUMN 48</u>

Line 45, "sent" should read --send--.

Signed and Sealed this

Twenty-second Day of May, 2007

JON W. DUDAS
*Director of the United States Patent and Trademark Office*